(12) United States Patent
Sato

(10) Patent No.: US 6,268,879 B1
(45) Date of Patent: Jul. 31, 2001

(54) INFORMATION COMMUNICATION APPARATUS

(75) Inventor: Yoshiaki Sato, Otsuki (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/284,916

(22) PCT Filed: Jan. 22, 1998

(86) PCT No.: PCT/JP98/00235

§ 371 Date: Apr. 21, 1999

§ 102(e) Date: Apr. 21, 1999

(87) PCT Pub. No.: WO98/33312

PCT Pub. Date: Jul. 30, 1998

(30) Foreign Application Priority Data

Jan. 23, 1997  (JP) .................................................... 9-010514

(51) Int. Cl.$^7$ .................................................... H04N 7/14
(52) U.S. Cl. .................................... 348/14.01; 379/93.02; 379/90.01
(58) Field of Search ............................. 379/90.01, 93.01, 379/93.02, 93.03, 93.05, 100.04, 140, 130, 131; 455/557, 556, 558; 348/14

(56) References Cited

FOREIGN PATENT DOCUMENTS

| 356004969A | * | 1/1981 | (JP) | ................................ H04M/17/02 |
| 408046938A | * | 2/1996 | (JP) | ................................ H04N/7/14 |
| 408149035A | * | 7/1996 | (JP) | ................................ H04B/1/38 |

OTHER PUBLICATIONS

Sokal et al. ; Computer Network for allowing . . . users to access the internet; WO 97/14118, May 1997.*
Haddad et al. ; Method for conditionally accessing an internet; WO 98/37479, May 1997.*
International Preliminary Examination Report for PCT/JP 98/00235 filed Jan. 22, 1998.

* cited by examiner

Primary Examiner—Curtis Kuntz
Assistant Examiner—Melur Ramakrishnaiah
(74) Attorney, Agent, or Firm—Ostrolenk, Faber, Gerb & Soffen, LLP

(57) ABSTRACT

It is an object of the present invention to provide a multi-function information communication apparatus which is perform data communication assuring security even in a publication telephone network requiring an SIM. For this purpose, the information communication apparatus includes a fixing unit to which a card-shaped communication device for performing data communication using a public telephone network is fixed, an operation means for executing various processes to the apparatus, a display means for displaying operation contents and an operation result obtained by the operation means, and a loading unit for inserting a card-shaped medium in which line subscriber information is stored. After data communication is performed by the card-shaped communication device fixed to the fixing unit, circuit use information is acquired, and the circuit use information is written in the card-shaped medium.

13 Claims, 23 Drawing Sheets

INFORMATION COMMUNICATION APPARATUS

TECHNICAL FIELD

The present invention relates to an information communication apparatus and, more particularly, to an information communication apparatus being capable of performing data communication by using a public telephone network.

BACKGROUND ART

In recent years, automobile telephone sets, portable telephone sets, and the like are world-widely popularly used as portable information communication apparatus, and various services such as audio and data communications are performed. As a system of the mobile information communication apparatus, a GSM (Global System for Mobile communications) system is generally used.

As one of the characteristic features of the GSM system, a point that line subscriber identification information such as telephone numbers, identification IDs, and the like is managed by SIMs (Subscriber Identification Modules; line subscriber information cards such as IC cards, IC plug, and the like).

When number management is performed by the SIMS, respective portable telephone sets and line subscriber identification information can be physically separated from each other. Therefore, usefulness that unnecessary telephone numbers need not be circulated can be obtained.

At present, the GSM system is world-widely used, and, as the SIMs, ten million cards have been issued. As the GSM system will be popularized in the future, the SIMs themselves will be strongly demanded. It is estimated that the number of SIMs to be issued will further increase.

On the other hand, in Japan, physical separation between mobile information communication apparatuses and telephone numbers is regulated in security. For this reason, the system such as SIMs which perform number management cannot be practically used.

However, at present, measures against security management of IC cards have advanced. When line subscriber identification information is changed into an IC card such as an SIM, high security can be assured.

In reception to this, in recent years, SIMs can be practically used in Japan. For example, various examinations are made such that SIMs serving as line subscriber information cards are used in a public telephone network or the like.

In recent years, various telephone sets of a PC card type (to be referred to as PC-card-type telephone sets hereinafter) having portable telephone functions such as PHS (Personal Handy-phone System) cards are practically used. Various information communication apparatuses being capable performing communication such as data transmission using such PC-card-type telephone sets are practically used.

A digital electronic still camera (to be referred to as an electronic camera hereinafter) having the following arrangement is generally used in recent years. That is, object light focused by a photographing optical system is converted into an electric video signal by an image-pickup means such as a CCD to be output, and the output video signal is electrically recorded on a recording medium.

In addition, in such an electronic camera, a fixing unit to which a PC card or the like is fixed is arranged, and the PC-card-type telephone set or the like is fixed to the fixing unit to make it possible to perform data communication of a video signal such as image data. Various electronic cameras each having the above arrangement will be proposed and practically used.

However, since dial buttons and the like are not arranged on the PC-card-type telephone set itself, the PC-card-type telephone set does not solely function as a telephone set.

That is, a PC-card-type telephone set is fixed to the above information communication apparatus, the electronic camera, or the like to be controlled by the information device, so that communication such as data transmission can be performed.

Therefore, it is meaningless that an SIM is incorporated in such a PC-card-type telephone set, and manufacturing costs increase. For this reason, when telephone number management performed by the SIM, communication such as data transfer using a public telephone network requiring the SIM cannot be performed by the information communication apparatus, or the electronic camera to which the PC-card-type telephone set is fixed.

The present invention has been made in consideration of the above points, and has as its object to provide an information communication apparatus being capable of easily performing communication such as data transmission even if a public telephone network requiring an SIM is used in an information communication apparatus or the like to which a card-shaped communication device is fixed and which performs communication such as data transmission by a communication means connected by a serial communication means.

It is another object to provide a multi-function information communication apparatus having, when an SIM is used, a function of assuring reliable security, a function of easily acquiring circuit use information such as charging information, and a function of displaying the circuit use information.

DISCLOSURE OF INVENTION

An information communication apparatus according to the first invention comprises: a fixing unit for fixing a card-shaped communication device for performing data communication using a public telephone network is fixed; operation means for causing the apparatus to execute various processes; display means for displaying contents and results of operation performed by the operation means; and a loading unit for inserting a card-shaped medium in which line subscriber information is stored; wherein after data communication is performed by the card-shaped communication cation device fixed to the fixing unit, circuit use information is acquired and is written in the card-shaped medium.

BEST MODE FOR CARRYING OUT THE INVENTION

The present invention will be described below with reference to illustrated embodiments.

Figure 1:
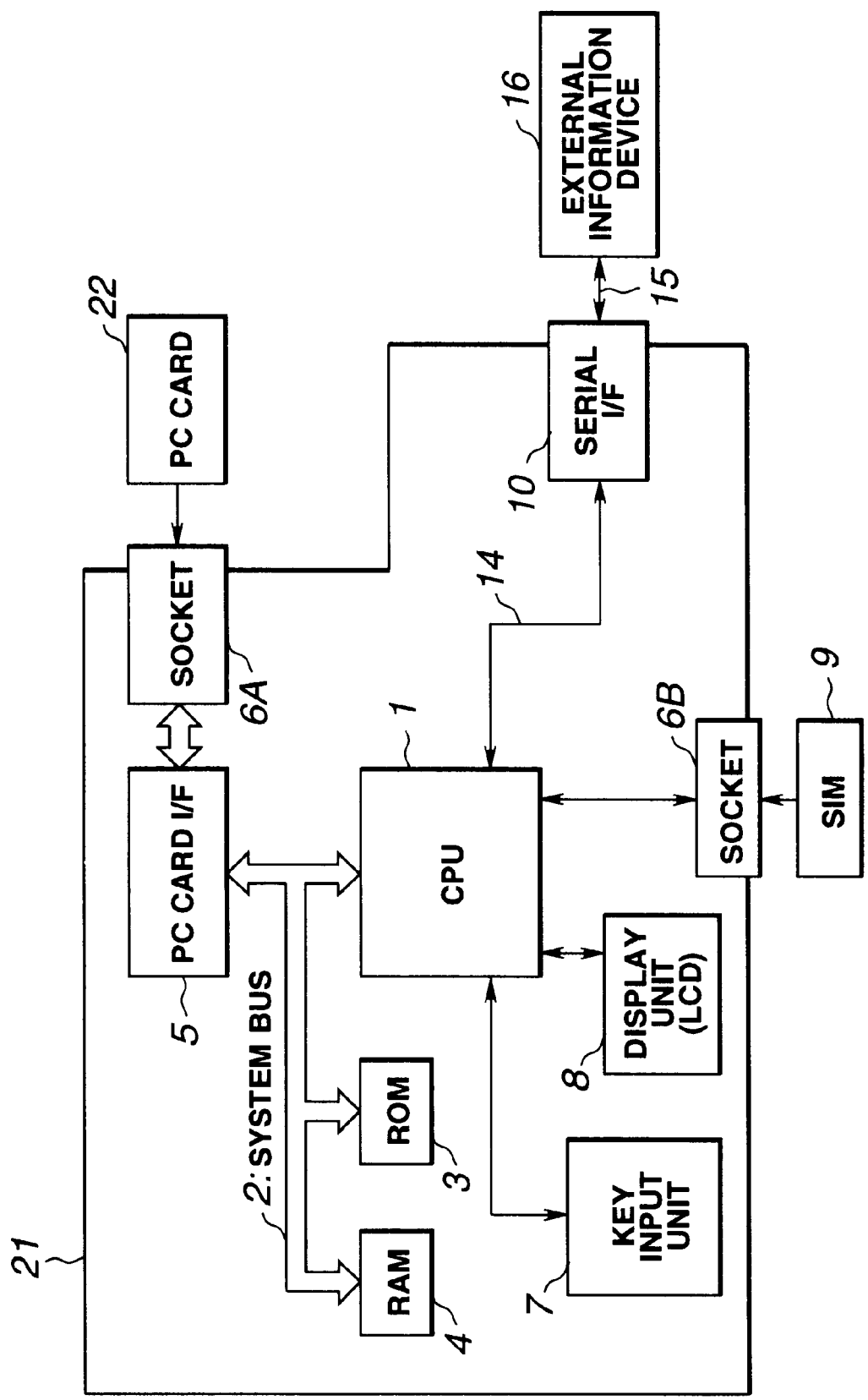
FIG. 1 is a block diagram showing the whole of an information apparatus according to the first embodiment of the present invention.

FIG. 1 is a block diagram showing the whole of an information apparatus according to the first embodiment of the present invention.

An information communication apparatus 21 according to the first embodiment is entirely controlled by a CPU 1 constituting a control circuit. To the CPU 1, a ROM 3, a RAM 4, a PC card interface I/F 5, and the like are electrically connected through a system bus 2.

In the ROM 3, a control program for performing various control operations by the CPU 1 is stored, and various data are temporarily stored in the RAM 4.

A PC card socket 6 A serving as a fixing unit to which a PC card 22 such as a card-shaped communication device or a card-shaped storage medium is detachably fixed is connected to the PC card I/F 5.

As the PC card 22, for example, a telephone card having a communication (telephone) function, an ATA (AT Attachment) card having the function of a storage device, or the like is used.

When the PC card 22 is fixed to the PC card socket 6A, the information communication apparatus 21 and the PC card 22 are electrically connected to each other.

Reception/transmission of various data between the CPU 1 and the PC card 22 is performed through the PC card I/F 5 controlled by the CPU 1.

A key input unit 7 constituted by an operation member such as a ten-key pad serving as an operation means and a display unit (LCD) 8 serving as a display means and constituted by a liquid-crystal display (to be referred to as an LCD hereinafter) or the like are electrically connected to the CPU 1 through control lines.

In this manner, an operator operates the key input unit 7 to input signals of various operation instructions to the CPU 1, so that the input signals are transmitted to the CPU 1 through a control line. The CPU 1 receives the operation instruction to perform control operations corresponding to these instructions, and the results are displayed on the display unit 8 through the control line. With this arrangement, the operator can confirm the results of the operation instructions input by the operator.

An SIM socket 6B serving as a loading unit on which a circuit subscriber information card (to be referred to an SIM hereinafter) 9 is detachably loaded is connected to the CPU 1 through a control line. The SIM 9 is a card-shaped medium in which circuit subscriber information or the like is stored.

When the SIM 9 is fixed to the SIM socket 6 B, the CPU 1 performs read control of various data from the SIM 9 and write control of various data in the SIM 9.

In addition, a serial I/F 10 serving as a serial communication means is connected to the CPU 1 through a serial signal line 14, and another external information device 16 (e.g., a portable telephone device, a portable terminal device (notebook-sized personal computer), an electronic camera, or the like) is electrically connected to the serial I/F 10 through a serial cable 15. In this manner, reception/transmission of various data between the information communication apparatus 21 and the external information device 16 is performed through the serial I/F 10 and the serial cable 15.

A data communication operation performed in the information communication apparatus 21 arranged as described above will be briefly described below.

For example, when a PC-card-type telephone set is fixed as the PC card 22, and a portable terminal device (to be referred to as a PC hereinafter) or an electronic camera or the like is connected as the external information device 16, the CPU 1 receives a data file, an image data file, or the like from the PC or the electronic camera (16) through the serial cable 15 and the serial I/F 10 and controls the PC card I/F 5 to output the data file or the like to the PC-card-type telephone set (22). In this manner, the data file or the like is transmitted to a communication destination.

The data file, the image data file, or the like transmitted from the communication destination to the PC-card-type telephone set (22) is received by the CPU 1 by controlling the PC card I/F 5. The CPU 1 outputs the data file, the image data file, or the like to the PC or the electronic camera (16) through the serial I/F 10 and the serial cable 15. When the external information device 16 such as the PC or the electronic camera receives the data file or the like, the external information device 16 records the data file or the like on a storage device incorporated in the external information device 16 itself. In this manner, the information communication apparatus 21 performs data communication with the communication destination.

A portable telephone set serving as the external information device 16 is connected through the serial cable 15. When a storage medium such as an ATA card is fixed to the PC card socket 6 A as the PC card 22, the CPU 1 controls PC card I/F 5 to read the data file, the image data file, or the like recorded on the storage medium (22) and to output the data file, the image data file, or the like to the portable telephone set (16) through the serial I/F 10 and the serial cable 15. In this manner, the data file or the like is transmitted to a communication destination.

The data file, the image data file, or the like transmitted from the communication destination to the portable telephone set (16) is input to the CPU 1 through the serial I/F 10 and the serial cable 15 under the control of the CPU 1. The CPU 1 controls the PC card I/F 5 to output the data file or the like to the storage medium (22), and the storage medium (22) stores it. In this manner, the information communication apparatus 21 performs data communication with the communication destination.

Figure 2:
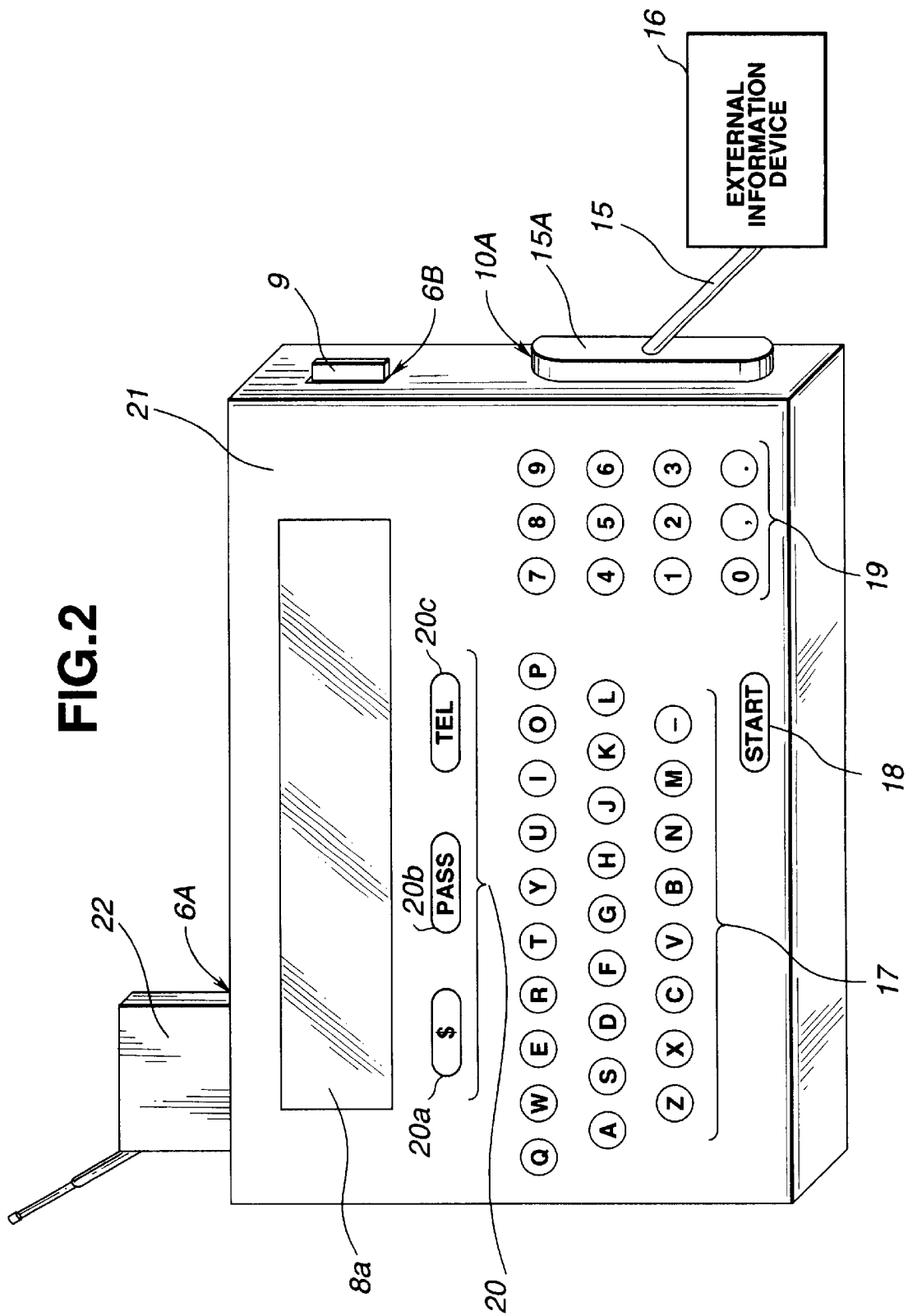
FIG. 2 is a schematic perspective view showing the appearance of the information communication apparatus in FIG. 1.

FIG. 2 is a schematic perspective view showing the appearance of the information communication apparatus 21 according to the first embodiment.

An LCD 8 a constituting the display unit 8 and an operation panel unit are arranged on the upper surface of the information communication apparatus 21. On the operation panel unit, a group of keys constituting the key input unit 7 serving as the operation means, i.e., alphabet keys 17 in which a group of keys consisting of alphabet keys of "A to Z" and a "- (hyphen)" key are arranged, ten keys 19 in which a group of keys consisting of number keys of "0 to 9", a ", (comma)" key, and a ". (point)" key are arranged, a start (START) key 18 for designating completion of inputting an operation instruction, function keys 20 in which a plurality of keys for designating specific operation instructions are arranged as a group of keys, and the like are arranged.

In FIG. 2, as an arrangement of the alphabet keys 17, a so-called QWERTY arrangement is shown. As an example of the function keys 20, a "$ (dollar)" key 20a for designating a display of circuit use information such as charging information, a "PASS" key 20b for designating mode switching to a password setting mode, a "TEL" key 20c for designating the start of a communication mode are shown.

On a side wall surface, a connector unit 10A of the serial I/F 10 and the SIM socket 6B are arranged. A connector 15A on one end side of the serial cable 15 is connected to the connector unit 10A, and the external information device 16 is connected to the other end side of the cable 15. The SIM 9 is fixed to the SIM socket 6B.

On the other side wall surface, the PC card socket 6A is arranged. A PC-card-type telephone set serving as the PC card 22 is fixed to the PC card socket 6A.

When an operator operates the various keys (17, 18, 19, and 20) as needed, data communication between the information communication apparatus 21, the PC-card-type telephone set (22), and the external information device 16 can be performed.

Figure 3:
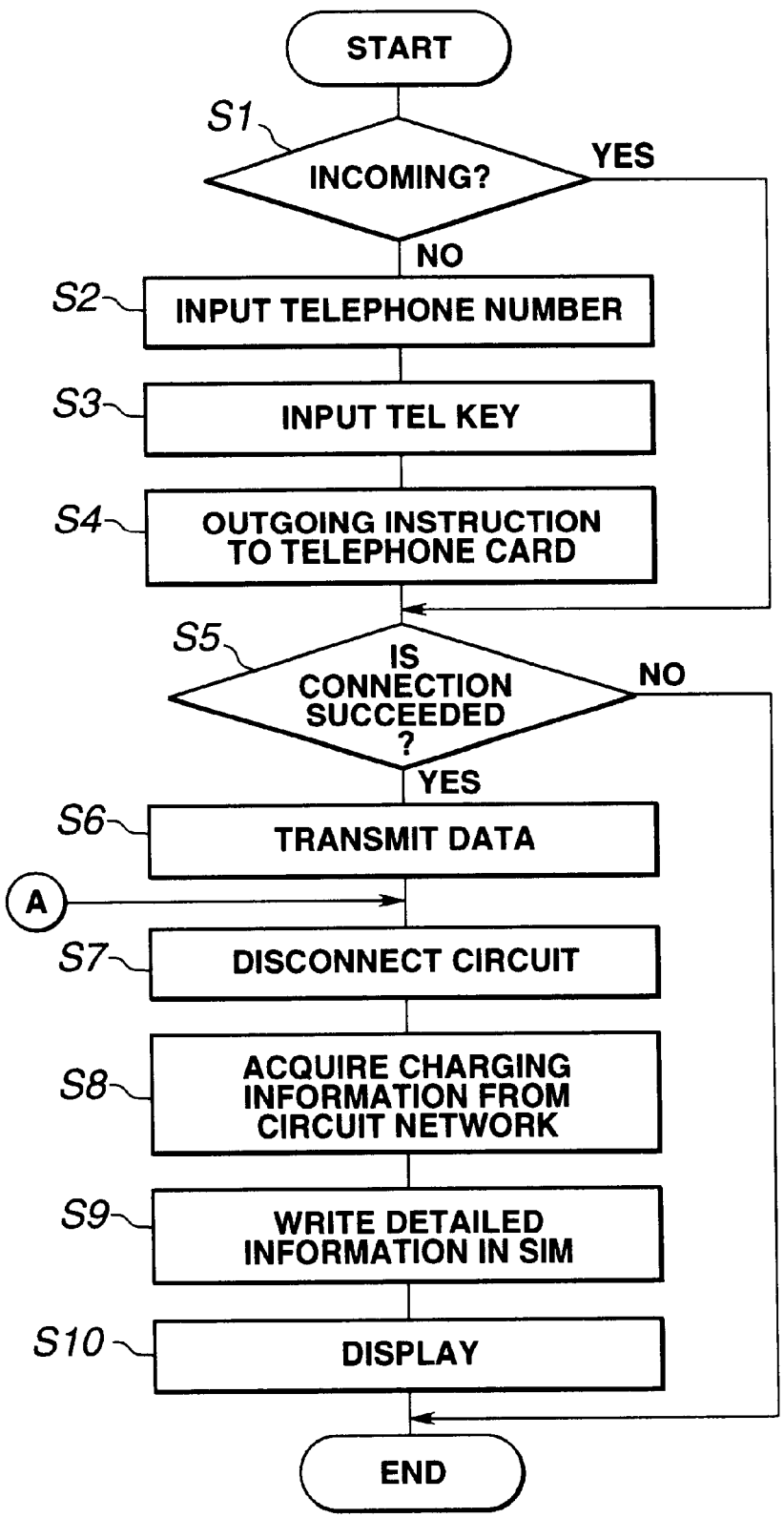
FIG. 3 is a flow chart showing the first communication mode in the information communication apparatus in FIG. 1.

Of operations in communication performed by the information communication apparatus 21 according to the first embodiment arranged as described above, the first communication mode will be described below with reference to the flow chart in FIG. 3.

Here, as shown in FIG. 2, the PC-card-type telephone set serving as the PC card 22 is fixed to the PC card socket 6A, and a portable terminal device, an electronic camera, or the like is connected to the serial I/F 10 as the external information device 16.

When a power is supplied to the information communication apparatus 21, and the communication mode is not set, an incoming signal is always monitored by the CPU 1. Here, the incoming signal denotes a signal for performing communication request from another information communication device (communication destination) to the PC-card-type telephone set (22) fixed to the information communication apparatus 21. More specifically, when the incoming signal is input to the PC-card-type telephone set (22) of the information communication apparatus 21 by performing communication request (making a call) from a communication destination through a telephone line, for example, a character string signal such as "RING" or "CALL" is transmitted to the CPU 1. The CPU 1 receives (detects) the character string signal, so that it is understood whether communication request is performed or not.

In step S1, an incoming signal is detected by the CPU 1. Here, if the incoming signal is detected, the flow shifts to step S5. If the incoming signal is not detected, it is determined that communication can be started, and the first communication mode for performing outgoing for another information communication device is started. The flow shifts to the process in step S2.

In step S2, an operator operates the ten keys 19 to input a telephone number. When the TEL key 20c of the function keys 20 is pressed in step S3, an designation instruction representing that the information communication apparatus 21 starts communication (outgoing) is input to the CPU 1, and the flow shifts to the process in next step S4.

In step S4, the CPU 1 receives the communication start designation instruction in step S3 to control the PC card I/F 5 and transmits telephone number information and an outgoing instruction input to the PC-card-type telephone set (22) fixed to the PC card socket 6A. The PC-card-type telephone set (22) receives the information and the outgoing instruction to perform an outgoing operation, i.e., a calling operation, and the flow shifts to the process in next step S5.

It is determined in step S5 whether connection to a communication destination is succeeded. Here, when a character string signal such as "connect" is transmitted to the PC-card-type telephone set (22) to the CPU 1, the CPU 1 determines that the connection to the communication destination is succeeded, and the flow shifts to the process in next step S6. On the other hand, when a character string signal such as "fail" is transmitted from the PC-card-type telephone set (22) to the CPU 1, the CPU 1 determines that connection to the communication destination fails, and a series of sequences are ended (END).

In step S5 described above, it is determined that the connection is succeeded, and the flow shifts to the process in step S6. In this case, in step S6, data communication with the communication destination is performed. The data communication performed here is the following operation. That is, a data file or the like recorded on the external information device 16 is data-transmitted to the communication destination, and the data file or the like transmitted from the communication destination is received and then recorded on the storage device of the external information device 16.

Upon completion of the data communication, the flow shifts to the process in next step S7, the connection state to the communication destination is disconnected. That is, a communication possible state is switched to a communication impossible state. Here, for example, the operator presses the TEL key 20c during communication to a communication disconnection signal to the CPU 1. The CPU 1 which receives this signal controls the PC card I/F 5 to perform communication disconnection by the PC-card-type telephone set (22), or a similar communication disconnection operation is performed. The flow shifts to the process in next step S8.

In step S8, charging information or the like related to the rate of the latest communication is acquired. This charging information is acquired such that, when there is a service that various pieces of information are transmitted from a management company (e.g., a telephone office or the like) for managing a whole of a circuit network immediately before disconnection of the communication, the pieces of information are received.

In this case, a state immediately after a line disconnection operation in step S7 described above is a state in which the connection state to the communication destination is only disconnected, the connection state to the circuit network management company is held.

By using time immediately after the line disconnection operation, various pieces of information can be acquired from the circuit network management company. Upon completion of information transmission from the line network management company, the connection state to the circuit network management company is also disconnected, and the connection state between the PC-card-type telephone set (22) and the circuit network becomes a complete disconnection state.

The charging information can be acquired by not only the above means but also a means using a service in which desired information can be acquired by calling a specific telephone of a center for managing charging information or the like of the circuit network management company or the like at desired time.

More specifically, after a line disconnection operation is performed upon completion of communication with the communication destination, the CPU 1 of the information communication apparatus 21 performs an automatic connection operation (so-called auto-dial or auto-login) to acquire charging information or the like related to the rate of the latest communication. In this case, the connection state between the PC-card-type telephone set (22) and the circuit network is changed into a complete disconnection state by a line disconnection operation performed upon completion of the communication with the communication destination, so that the information communication apparatus 21 must be completely free from the communication state.

The flow shifts to the process in next step S9. In step S9, the CPU 1 forms detailed information such as date information, use time information, destination telephone number information, and charging information (rate information) on the basis of the acquired charging information or the like. After the CPU 1 records the information on the SIM 9, the flow shifts to the process in next step S10. In step S10, the detailed information is displayed on the LCD 8a, and the series of sequences are ended (END).

A storage medium such as an ATA card is fixed to the PC card socket 6A as the PC card 22, and the portable telephone set is connected to the serial I/F 10 as the external information device 16 through the serial cable 15. In this state, when the circuit use information serving as the detailed information is written in the SIM 9, if the SIM 9 has no empty capacity, the information may be written in the PC card (storage medium) 22 fixed to the PC card socket 6A.

Here, a display form of the detailed information displayed on the LCD 8a in step S10 is shown in Table 1:

TABLE 1

| Date | Use Time | Destination Telephone Number | Rate |
| --- | --- | --- | --- |
| January 12, 1996 | 5 min 20 sec | 0123-45-6789 | 200 yen |

When the circuit subscriber information card (SIM) 9 is to be used, in order to assure the security of the SIM 9, a password inherent in each card may be set. This password is set by a manufacturer of the SIM 9, and the password must be designed to be prevented from being easily rewritten on a user side. With respect to this password, a secret is strictly guarded such that the password is informed to only a consumer who properly buys the SIM 9.

When the SIM 9 strictly managed as described above is fixed to the information communication apparatus 21 to be used, the password corresponding to the SIM 9 is set and registered in advance on the information communication apparatus 21 side, and a sequence for checking whether the password of the fixed SIM 9 coincides with the password registered in the information communication apparatus 21 in a sequence in the communication mode used in communication, i.e., a password check, is added. In this case, a third party who does not know the password of the SIM 9 illegally has the SIM 9, he/she cannot easily use the SIM 9. Therefore, the security of the SIM 9 can be improved.

Figure 4:
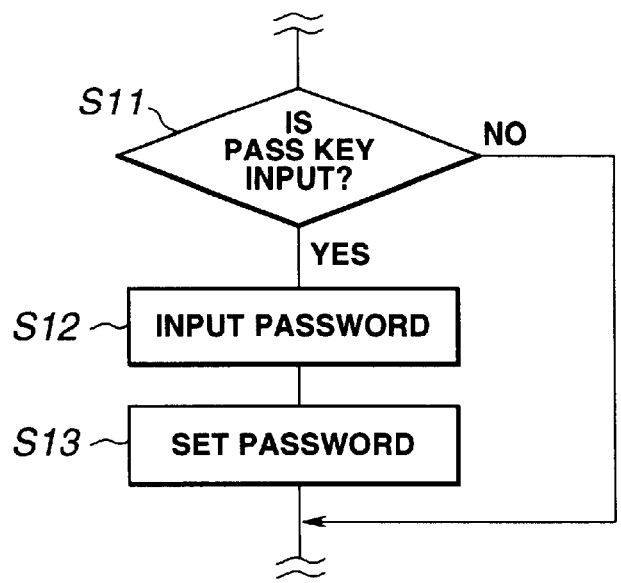
FIG. 4 is a flow chart showing a password setting mode in the information communication apparatus in FIG. 1.

In the information communication apparatus 21 according to the first embodiment, a password setting mode shown in the flow chart in FIG. 4 is prepared, and a second communication mode additionally having a password check sequence for checking whether a password set in the password setting mode coincides with the password of the fixed SIM 9 is prepared.

More specifically, in order to set a password in this information communication apparatus 21, when a state except for the communication mode is set, the mode can be switched to the password setting mode by pressing the PASS key 20b.

As described above, when a power is not supplied to the information communication apparatus 21, and the communication is not set, an incoming signal is always monitored by the CPU 1. At the same time, a mode switching signal is also always monitored.

More specifically, when a power source is supplied to the information communication apparatus 21, and a state except for the communication mode is set, the CPU 1 monitors in step S11 whether the PASS key 20b is pressed. Here, when an operator presses the PASS key 20b to perform switching to the password setting mode, the input signal is detected by the CPU 1. In this manner, the flow shifts to a password setting mode following the process in next step S12.

If the PASS key 20b is not pressed, a normal operation sequence, i.e., a state except for the communication mode is kept without shifting to the password setting mode, and the CPU 1 keeps on monitoring the incoming signal or the like.

In step S11 described above, the PASS key 20b is pressed, and the flow shifts to a password setting mode of in step following step S12. At this time, in step S12, an operator operates the alphabet keys 17 and the ten keys 19 to input the password set in the SIM 9. In this case, the CPU 1 receives the password input signal, and the CPU 1 sets a password in next step S13. In this manner, the SIM 9 corresponding to the password input in step S12 described above can be used in the information communication apparatus 21. The state returns to a state immediately before the password setting mode is set.

Password information set in step S13 described above is held in the RAM 4 or the like as reference data. The password information is referred to at any time in the password check sequence when a communication operation is performed by the information communication apparatus 21.

Figure 5:
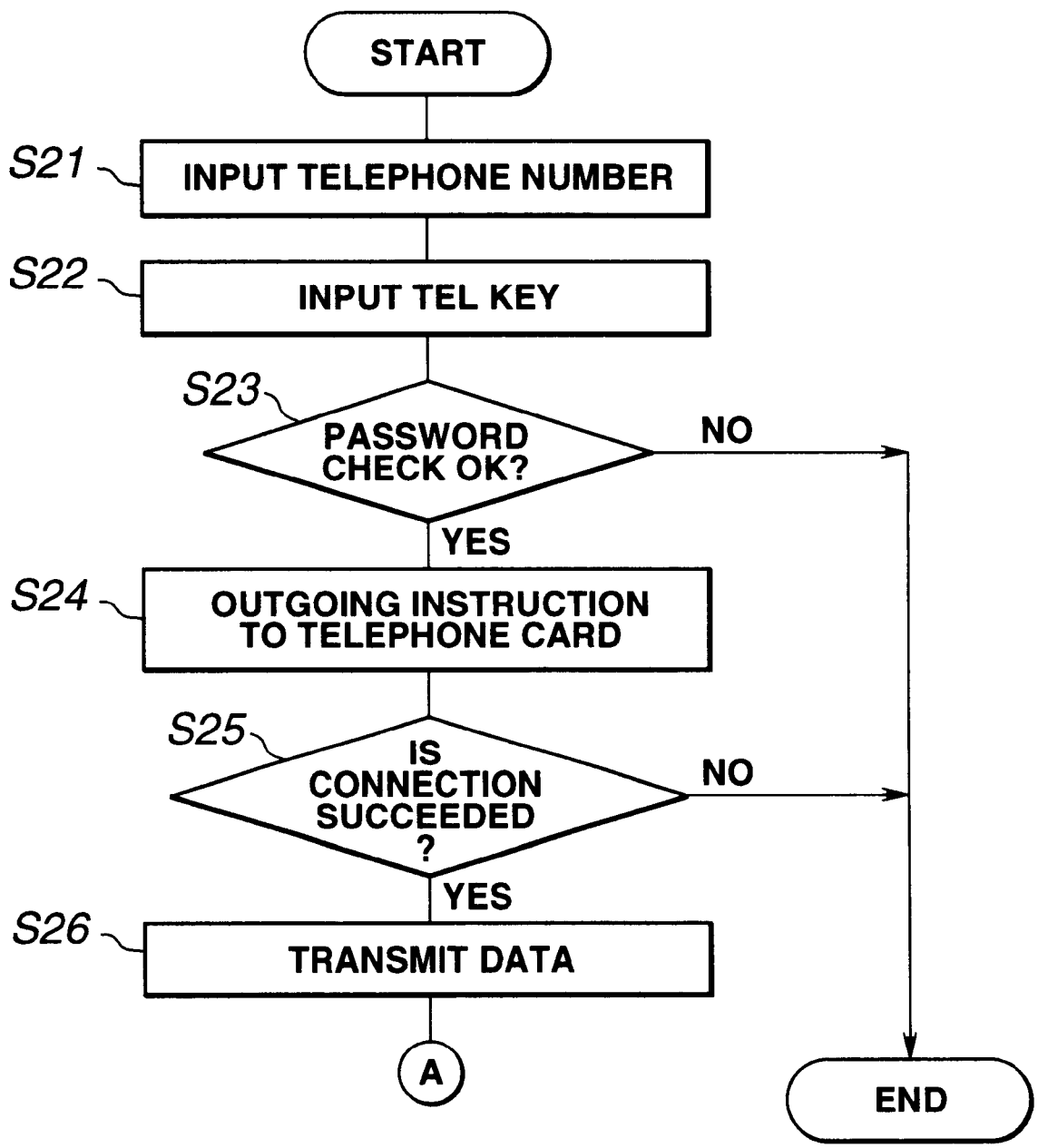
FIG. 5 is a flow chart showing the second communication mode in the information communication apparatus in FIG. 1.

Of operations in communication performed by the information communication apparatus 21 according to the first embodiment, the second communication mode additionally having the password check sequence will be described below with reference to the flow chart in FIG. 5.

In step S21, an operator operates the ten keys 19 to input a telephone number. Subsequently, in step S22, the operator presses the TEL key 20c to input a designation instruction that communication is started from the information communication apparatus 21 (making a call) to the CPU 1, and the flow shifts to the process in next step S23.

In step S23, the CPU 1 receives the communication start designation instruction to read the password information and the password which is set and registered in advance in the password setting mode (see FIG. 4), so that both the passwords are compared with each other to perform a password check operation.

Here, when both the passwords coincide with each other, the flow shifts to the process in next step S24. When both the passwords does not coincide with each other, the second communication mode is ended, and the state returns to a normal standby state.

As a result of the password check operation in step S23 described above, the password set in the SIM 9 coincides with the password set in the information communication apparatus 21 coincide with each other, and the flow shifts to the process in step S24. In step S24, the CPU 1 controls the PC card I/F 5 on the basis of the communication start designation instruction in step S22 described above to transmit the telephone number information and the outgoing instruction input in step S21 to the PC-card-type telephone set (22) fixed to the PC card socket 6A. In this manner, the PC-card-type telephone set (22) executes an outgoing operation. The flow shifts to the process in next step S25.

In step S25, is determined whether connection to a communication destination is succeeded. Here, when a character string signal such as "connect" is transmitted from the PC-card-type telephone set (22) to the CPU 1, the CPU 1 determines that the connection to the communication destination is succeeded, and the flow shifts to the process in next step S26. On the other hand, when a character string signal such as "fail" is transmitted from the PC-card-type telephone set (22) to the CPU 1, the CPU 1 determines that connection to the communication destination fails, and a series of sequences are ended (END).

In step S25 described above, it is determined that the connection is succeeded, and the flow shifts to the process in step S26. In this case, in step S26, transmission or the like of various data (data communication) to the communication destination data is performed in step S26. Upon completion of the data communication, a line disconnection operation is performed. The processes following the line disconnection operation are the same as the processes in the steps following step S7 shown in FIG. 3.

As described above, according to the first embodiment, the SIM socket 6B is arranged on the information communication apparatus 21 side, and the SIM 9 is detachably arranged in the SIM socket 6B. When the SIM 9 is fixed to the SIM socket 6, communication such as data transmission using a public telephone network requiring the SIM 9 can be easily performed.

In addition, the password setting mode for setting and registering, in advance, the password corresponding to the password set in the SIM 9 and the second communication mode for comparing (password check) the set password on the SIM 9 side and the password set and registered on the information communication apparatus 21 side are set. For this reason, the SIM 9 is prevented from being easily used by a third party who illegally gets the SIM 9, thereby improving the security of the SIM 9.

In the operation sequence of the first communication mode described above, in step S10 (see FIG. 3), a display form (see Table 1) of detailed information displayed on the LCD 8a is not limited, and another display form can also be used. Another display form of the detailed information will be described below.

Figure 6:
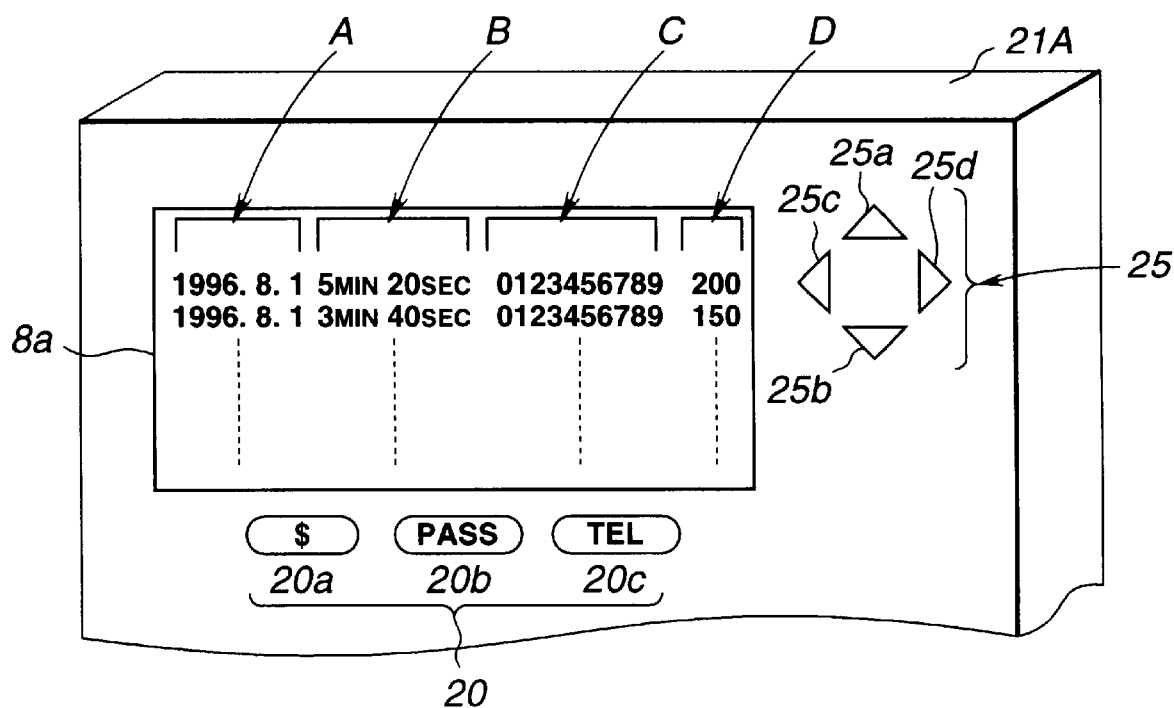
FIG. 6 is a schematic perspective view showing a main part of a modification of the information communication apparatus according to the first embodiment.

FIG. 6 is a schematic perspective view showing a modification of the information communication apparatus 21 according to the first embodiment. In an information communication device 21A according to this modification, cursor movement keys 25 are additionally arranged as a part of the key input unit 7 formed on the operation panel unit. The other components are the same as those in the first embodiment, and a description thereof will be omitted.

The cursor movement keys 25 are constituted by a group of four triangular keys arranged near the display unit 8 (LCD 8a) of the operation panel unit on the upper surface of the information communication device 21A. The four keys are arranged such that the tops of the triangular shapes face the outside and such that all the four keys form a lozenge.

The four keys constituting the cursor movement keys 25 are an upper movement key 25a in which the top of the triangular shape indicates the upper direction, a lower movement key 25b in which the top of the triangular shape indicates the lower direction, a left movement key 25c in which the top of the triangular shape indicates the left direction, and a right movement key 25d in which the top of the triangular shape indicates the right direction.

A communication operation performed in the information communication device 21A arranged as described above is the same as in the first embodiment described above (see FIG. 3). However, a display form of detailed information or the like displayed in step S10 is different from that in the first embodiment.

More specifically, the display form of the detailed information or the like in the first embodiment described above is designed such that various pieces of information or the like related to the latest communication are displayed on the LCD 8a as shown in Table 1. However, in this modification, all histories related to communication recorded on the SIM 9 can be displayed.

In the SIM 9, each time communication is performed, all detailed information formed on the basis of acquired charging information or the like can be recorded. The detailed information can be displayed on the LCD 8*a* by pressing the $ key 20*a* of the function keys 20.

Therefore, an operator presses the $ key 20*a* to transmit a display instruction of a charging information display signal to the CPU 1. The CPU 1 which receives the charging information display signal reads all the detailed information of such as charging information or the like recorded on the SIM 9 to display the detailed information on the LCD 8*a*. At this time, the display form of the detailed displayed on the LCD 8*a* is almost the same as that in Table 1. As shown in FIG. 6, date information is displayed in column A on the left side of the LCD 8*a*, use time information in communication in column A is displayed on column B, destination telephone number information obtained at this time is displayed in column C, and charging information (rate information) obtained at this time is displayed in column D.

Here, since the number of cases of the detailed information recorded on the SIM 9 is large, when all the detailed information cannot be displayed on the LCD 8*a* at the same time, the operator operates the upper movement key 25*a* or the lower movement key 25*b* of the cursor movement keys 25 to scroll the information displayed on the screen in a vertical direction. In this manner, a display range can be changed to display desired detailed information.

With the above arrangement, in the above modification, the same advantage as in the first embodiment can be obtained. The cursor movement keys 25 are additionally arranged, and all detailed information such as charging information recorded on the SIM 9 and related to communication is displayed on the LCD 8*a*. For this reason, at any desired time, and a communication history such as detailed information can be easily referred to.

The second embodiment of the present invention will be described below. The second embodiment describes a case wherein an electronic camera having a communication function is used as an information communication device.

Figure 7:
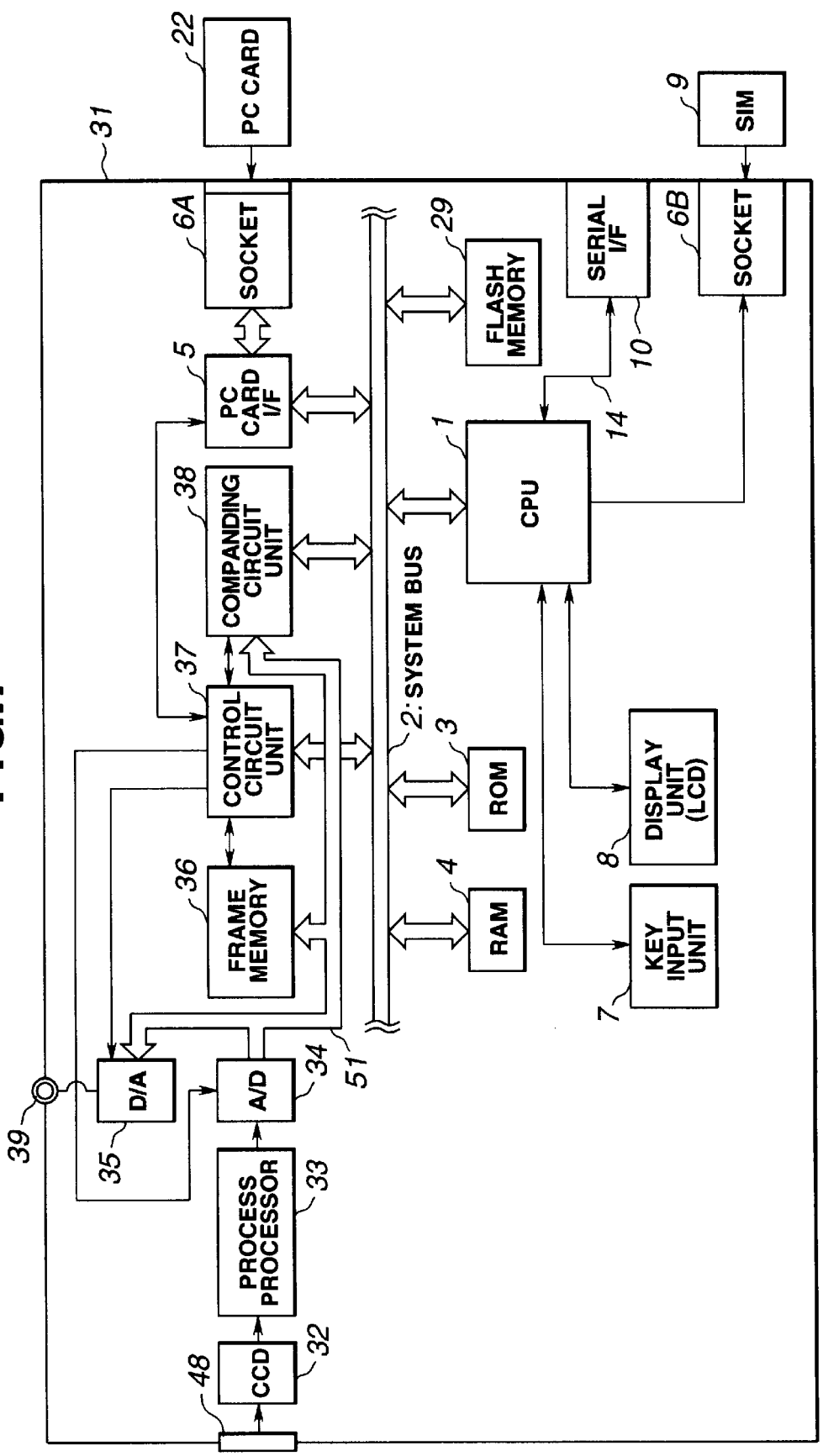
FIG. 7 is a block diagram showing an electronic camera according to the second embodiment of the present invention.

FIG. 7 is a block diagram showing the arrangement of an electronic camera according to the second embodiment.

An electronic camera 31 according to the second embodiment is constituted by a control circuit unit formed by a control circuit or the like, a camera unit formed by a component related to photographing of an object image and recording or the like of image data (video signal) obtained by the photographing, and the like.

The control circuit unit is constituted by an arrangement which is almost the same as that of the information communication device (21) of the first embodiment. The control circuit unit is constituted by: a CPU 1 for controlling the electronic camera 31 as a whole; a ROM 3 in which a control program for causing the CPU 1 to perform various control operations is stored; a RAM 4 in which various data are temporarily stored; a PC card socket 6A to which a PC card 22 is fixed; a PC card I/F 5, connected to the PC card socket 6A, for controlling the PC card 22 on the basis of the control of the CPU 1; a key input unit 7 serving as an operation means; a display unit 8 serving as a display means and constituted by an LCD or the like; an SIM socket 6B to which the SIM 9 is detachably fixed; a serial I/F 10, connected by the serial signal line 14, for controlling data transmission between the electronic camera 31 and another external information device 16; and the like.

The camera unit of the electronic camera 31 is controlled by a control circuit unit 37. The camera unit is constituted by: an image-pickup means (to be referred to as a CCD hereinafter) 32 constituted by a solid-state image-pickup element or the like for converting an optical picture focused by a photographing optical system 48 into an electric video signal to output the electric video signal, a process processor 33; an A/D converter 34 for converting a video signal (analog signal) into a digital signal; a video bus 51 to which a video signal is transmitted; a D/A converter 35 for converting a digital video signal into an analog signal; a video signal output terminal 39 serving as a video signal output means for outputting a signal as a throughout video signal to an external display device (e.g., a CRT display or the like, not shown); a compressing/expanding circuit (companding circuit) 38 for performing a compressing/expanding process to the digital video signal; a flash memory 29 on which a photographed video signal (digital) is recorded; and the like.

The control circuit unit and the camera unit are connected to each other through the system bus 2, so that various signals are transmitted between the control circuit unit and the camera unit.

Figure 8:
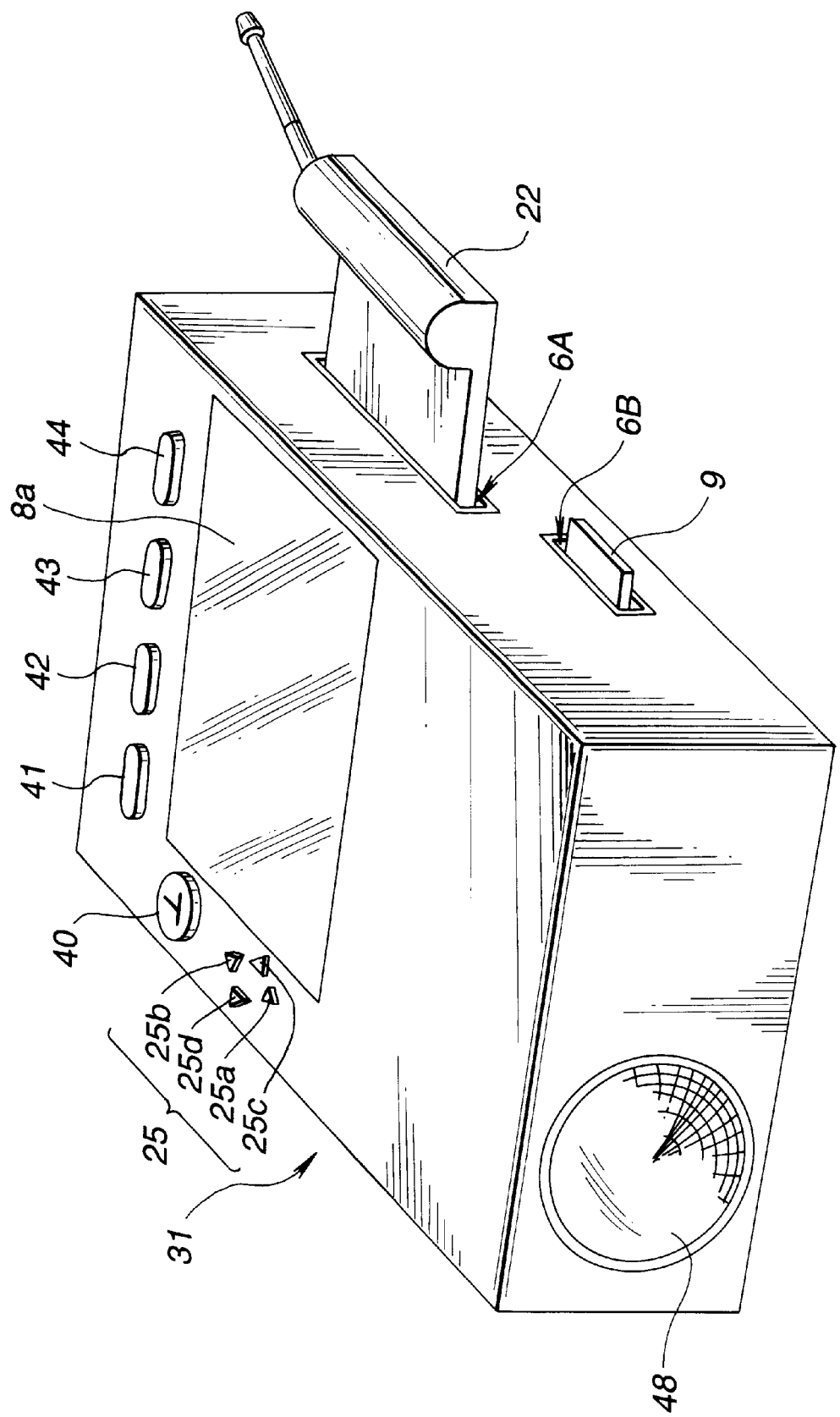
FIG. 8 is a schematic perspective view showing the appearance of the electronic camera in FIG. 7.

FIG. 8 is a schematic perspective view showing the appearance of the electronic camera 31 according to the second embodiment.

The LCD 8*a* constituting the display unit 8 is arranged on the upper surface of the electronic camera 31. Near the LCD 8*a*, various operation keys corresponding to the key input unit 7 serving as the operation means, i.e., a video trigger key 40 serving as a video recording designation means for generating a photographing start signal or a communication start signal and also serving as a communication designation means, a function key 41 for designating a specific operation instruction, a MODE key 42 for designating mode switching, an ENTER key 43 for determining characters or the like input by the various keys, a character selection key 44 for selecting characters or the like to be input, cursor movement keys 25 constituting four triangular keys for changing a display range of in formation displayed on the LCD 8*a*, and the like are arranged.

The four keys constituting the cursor movement keys 25 consist of a group of four keys, i.e., an upper movement key 25*a* in which the top of the triangular shape indicates the upper direction, a lower movement key 25*b* in which the top of the triangular shape indicates the lower direction, a left movement key 25*c* in which the top of the triangular shape indicates the left direction, and a right movement key 25*d* in which the top of the triangular shape indicates the right direction. The four keys are arranged near the LCD 8*a* such that the tops of the triangular shapes face the outside.

The PC card socket 6A and the SIM socket 6B are arranged on one side surface of the electronic camera 31, and a PC-card-type telephone set serving as the PC card 22 and the SIM 9 are fixed to both the sockets 6A and 6B, respectively.

The photographing optical system 48 constituting a photographing lens or the like is arranged on the front surface of the electronic camera 31, and the CCD 32 (not shown in FIG. 8, see FIG. 7) is arranged behind the photographing optical system 48 in the camera body.

The electronic camera 31 is designed such that a desired operation mode can be selected by pressing the MODE key 42 by an operator. As operation modes, a "recording mode", a "reproduction mode", and a "transmission mode" are prepared. Each time the MODE key 42 is pressed, the modes can be sequentially switched to each other.

Operations in operation modes of the electronic camera according to the second embodiment arranged as described above will be briefly described below.

In the recording mode, an optical picture focused by the photographing optical system 48 is converted into an electric video signal by the CCD 32 to output the electric video signal. The video signal (analog) is input to the A/D converter 34 through the process processor 33 to be digitized. The digitized video signal is temporarily stored in the frame memory 36 through the video bus 51, and, at the same time, output to the D/A converter 35 to be converted into an analog signal. The analog signal is output to an external display device (not shown) through the video signal output terminal 39 and displayed as a continuous image.

When the video trigger key 40 is pressed to generate a photographing start signal, the digital video signal stored in the frame memory 36 is output to the companding circuit unit 38 through the video bus 51 to be subjected to a compressing process. The video signal (digital image data) subjected to the compressing process is stored in the flash memory 29 through the system bus 2.

The photographed video signal (digital image data) subjected to a compressing process is stored in the flash memory 29, and can also be recorded on an external storage medium. In this case, when the storage medium card is fixed to the PC card socket 6A as the PC card 22, the key input unit 7 is operated to give designation that a recording operation is performed to the PC card 22 to the CPU 1. The CPU 1 receives the designation instruction to control the PC card I/F 5, and records the video signal on the PC card (storage medium card) 22 through the PC card I/F 5.

On the other hand, in the reproduction mode, the CPU 1 reads a video signal (digital image data) recorded on the flash memory 29 or the PC card 22, and outputs the video signal to the companding circuit unit 38 through the system bus 2. The video signal is subjected to an expanding process by the companding circuit unit 38 to be restored to a video signal (digital) in a non-compression state. This video signal is temporarily stored in the frame memory 36 through the video bus 51. The video signal temporarily stored in the frame memory 36 is repeatedly read by the D/A converter 35 to be sequentially converted into an analog signal. The analog signal is output from the video signal output terminal 39 to the external display device to be reproduced.

In the recording mode and the reproduction mode, the CPU 1 sets the control circuit unit 37 through the system bus 2. The control circuit unit 37 generates various designation instructions on the basis of the operation mode to perform various operations. More specifically, the control circuit unit 37 controls, on the basis of the designation instruction from the CPU 1, the A/D converter 34, the D/A converter 35, the frame memory 36, the companding circuit unit 38, the PC card I/F 5, and the like which are connected through a control line.

Figure 9:
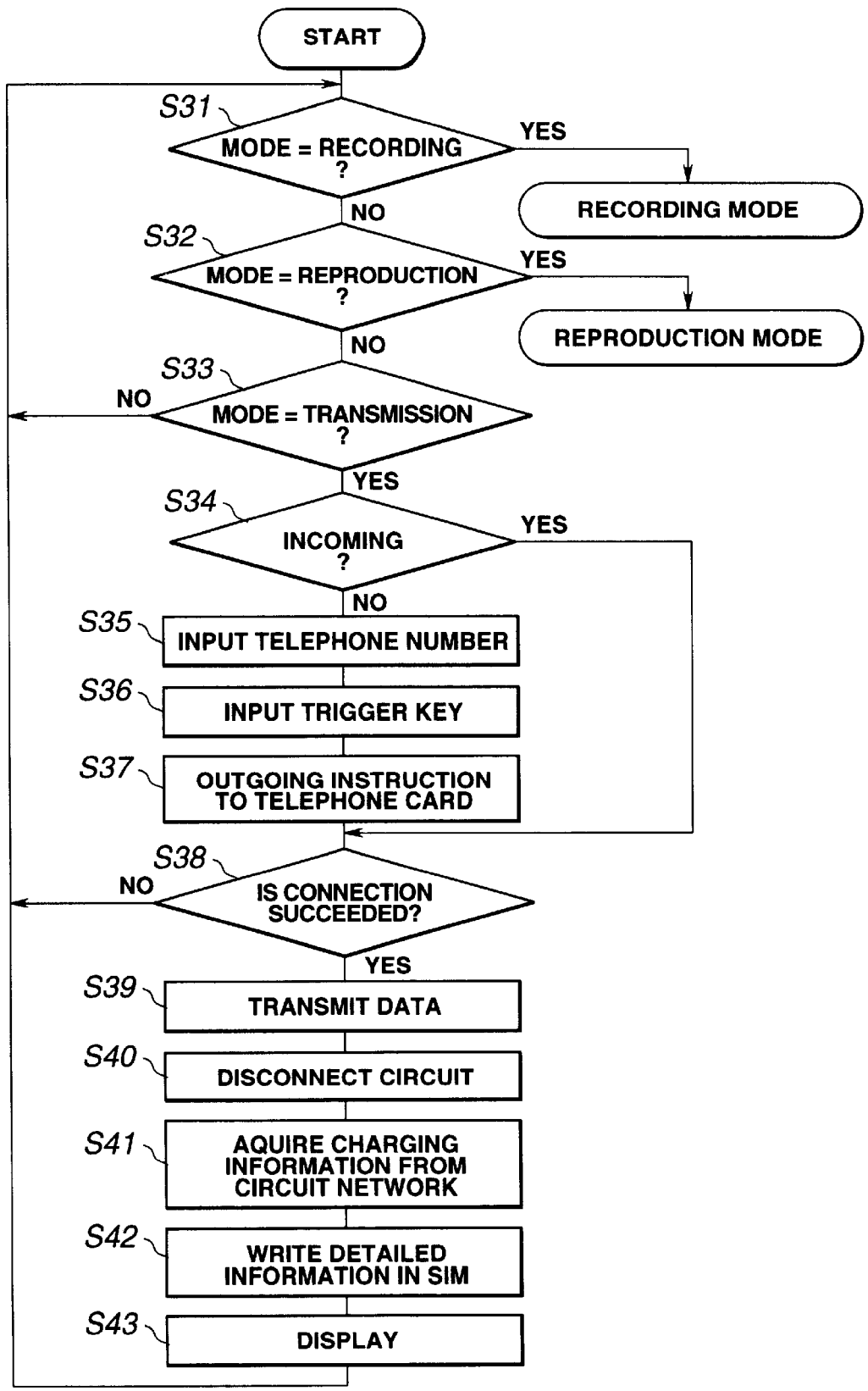
FIG. 9 is a flow chart showing the operation of an electronic camera in FIG. 7.

FIG. 9 is a flow chart showing the operation of the electronic camera 31 according to the second embodiment.

An operation mode is determined in steps S31 to S33. More specifically, the CPU I detects an input signal generated from the MODE key 42 by pressing the MODE key 42 by an operator to determine a selected operation mode.

In step S31, it is determined whether a recording mode is selected. At this time, if it is determined that the recording mode is selected, the flow shifts to the sequence of the recording mode. If the recording mode is not selected, the flow shifts to the process in next step S32.

In step S32, it is determined whether a reproduction mode is selected. If it is determined that the reproduction mode is selected, the flow shifts to the sequence of the reproduction mode. If the reproduction mode is not selected, the flow shifts to the process in next step S33.

In step S33, it is determined whether a transmission mode is selected. If it is determined that the transmission mode is not selected, it is determined that the MODE key 42 is not operated, the flow returns to an initial state of an operation mode determination sequence (steps S31 to S33). The same process is repeated until the operator selects any one of the operation modes. On the other hand, it is determined that the transmission mode is selected, the flow shifts to the process in next step S34.

The processes in steps following step S34 are a sequence of the transmission mode. In this transmission mode, the CPU 1 monitors the PC-card-type telephone set (22) to check whether the PC-card-type telephone set (22) receives an incoming signal, e.g., a character string signal such as "RING" or "CALL". At this time, if the incoming signal is detected, the flow shifts to the process in step S38. If the incoming signal is not detected, the flow shifts to the process in next step S35.

In step S35, the operator operates the character selection key 44 and the ENTER key 43 to input a telephone number. Upon completion of the telephone number input operation, the flow shifts to the process in next step S36.

A concrete example of the telephone number input operation performed at this time will be described below with reference to FIGS. 11 and 12 (to be described later).

In step S36, the operator presses the video trigger key 40 to input a designation instruction representing that communication is started (making a call) to the CPU 1. When the CPU 1 receives the designation instruction, the CPU 1 controls the PC card I/F 5 in next step S37 to transmit telephone number information and an outgoing instruction input in step S35 to the PC-card-type telephone set (22) fixed to the PC card socket 6A. In this manner, the PC card (22) executes an outgoing operation. The flow shifts to the flow in step S38.

In step S38, it is determined whether connection to a communication destination is succeeded. If a character string signal such as "connect" is transmitted from the PC-card-type telephone set (22) to the CPU 1, the CPU 1 determines that the connection to the communication destination is succeeded, and the flow shifts to the process in next step S39. In step S39, the CPU 1 performs data communication with the communication destination. The data communication is an operation of transmitting an image file or the like recorded on the flash memory 29 to the communication destination, an operation of recording the image file or the like transmitted from the communication destination on the flash memory 29, or the like. Upon completion of the data communication, the flow shifts to the process in next step S40.

If a character string signal such as "fail" is transmitted from the PC-card-type telephone set (22) to the CPU 1 in step S38 described above, the CPU 1 determines that connection to the communication destination fails, the flow shifts to the process in step S31 described above, and the subsequent sequence is repeated.

In step S40, the connection state to the communication destination is disconnected by the PC-card-type telephone set (22) or the communication destination. Subsequently, in next step S41, charging information or the like related to the rate of the latest communication is acquired, and the flow shifts to the process in next step S42.

In step S42, the CPU I forms detailed information such as date information, use time information, destination telephone number information, or charging information (rate information) on the basis of the charging information or the like acquired in step S41 described above. After the detailed information is recorded on the SIM 9, the flow shifts to the process in next step S43. In step S43, the detailed information is displayed on the LCD 8a. Thereafter, the flow returns to the process in step S31 described above, and the subsequent processes are repeated.

A storage medium such as an ATA card is fixed to the PC card socket 6A as the PC card 22, and a portable telephone set is connected to the serial I/F 10 as the external information device 16 through the serial cable 15. In this state, when the circuit use information serving as the detailed information is written in the SIM 9, if the SIM 9 has no empty capacity, the information may be written in the PC card (storage medium) 22 fixed to the PC card socket 6A.

Here, in step S43 described above, a display form of the detailed information displayed on the LCD 8*a* is shown in Table 2.

TABLE 2

| Date | Use Time | Destination Telephone Number | Rate |
|---|---|---|---|
| ⋮ | ⋮ | ⋮ | ⋮ |
| January 12, 1996 | 5 min 20 sec | 0123-45-6789 | 200 yen |
| February 12, 1996 | 3 min 40 sec | 0123-45-6789 | 150 yen |
| ⋮ | ⋮ | ⋮ | ⋮ |

Figure 10:
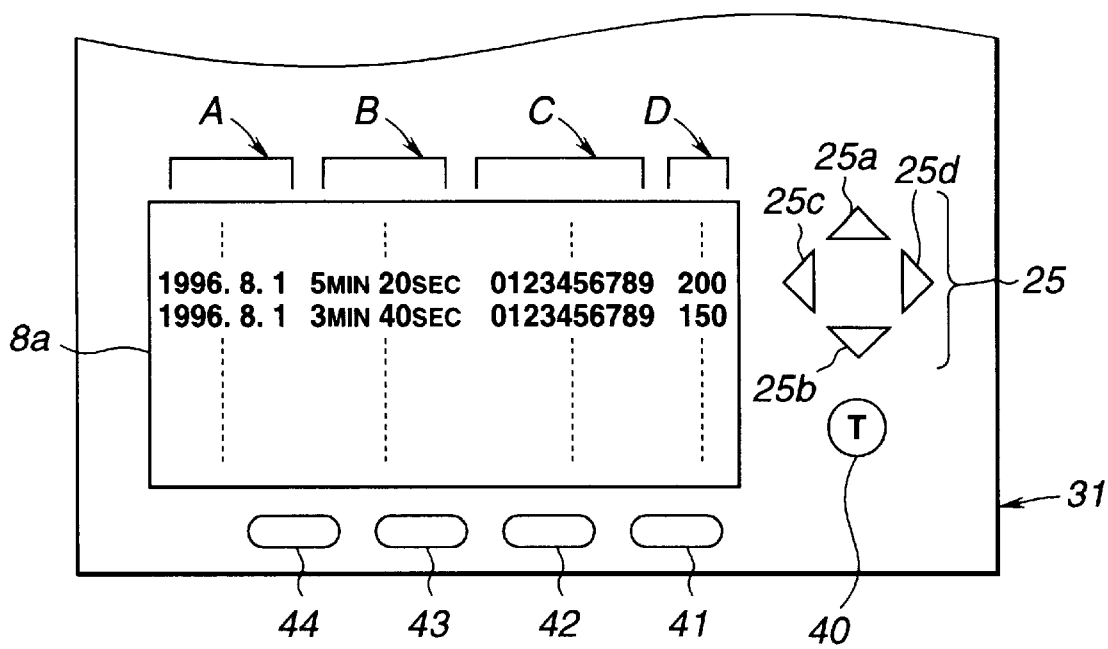
FIG. 10 is an upper view partially showing a main part of the electronic camera in FIG. 7, and is a view for explaining another display form of detailed information in a charging information display mode.

FIG. 10 is an upper view partially showing a main part of the electronic camera 31 according to the second embodiment and shows the LCD 8*a* and respective operation keys. Another display form of detailed information in the sequence of the charging information display mode in step S43 described above will be described below with reference to FIG. 10.

The charging information display mode is started by operating the function key 41 by an operator. More specifically, when an input signal (charging information display instruction) is transmitted from the function key 41 to the CPU 1, the CPU 1 reads all communication history information such as detailed information recorded on the SIM 9 and displays the communication history information on the LCD 8*a*. This series of operation modes are the charging information display mode.

When all the detailed information cannot be displayed on the LCD 8*a* at once because the number of cases of the detailed information recorded on the SIM 9 is large, the operator operates the upper movement key 25*a* or the lower movement key 25*b* of the cursor movement keys 25 to scroll the information displayed on the screen in the vertical direction, thereby changing the display range. In this manner, desired detailed information can be displayed. In FIG. 10, a display on the LCD 8*a* is briefly illustrated.

The procedure of a telephone number input operation performed in step S35 in the operation sequence of the transmission mode will be described below.

Figure 11:
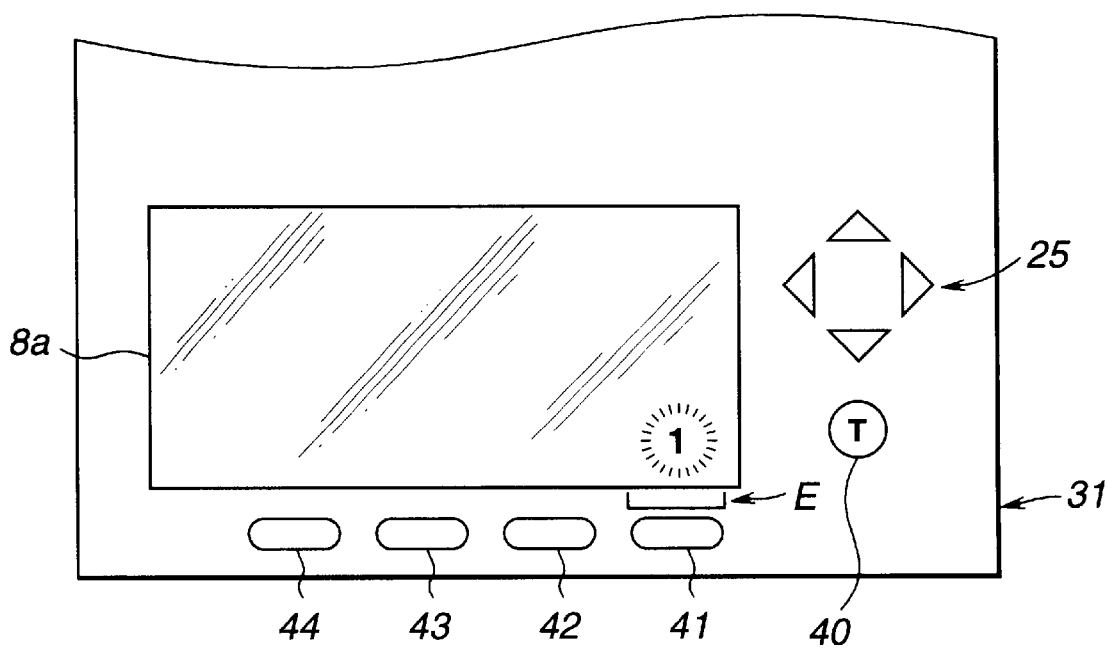
FIG. 11 is an upper view partially showing a main part of the electronic camera in FIG. 7, and is a view for explaining a concrete example of a telephone number input operation.
Figure 12:
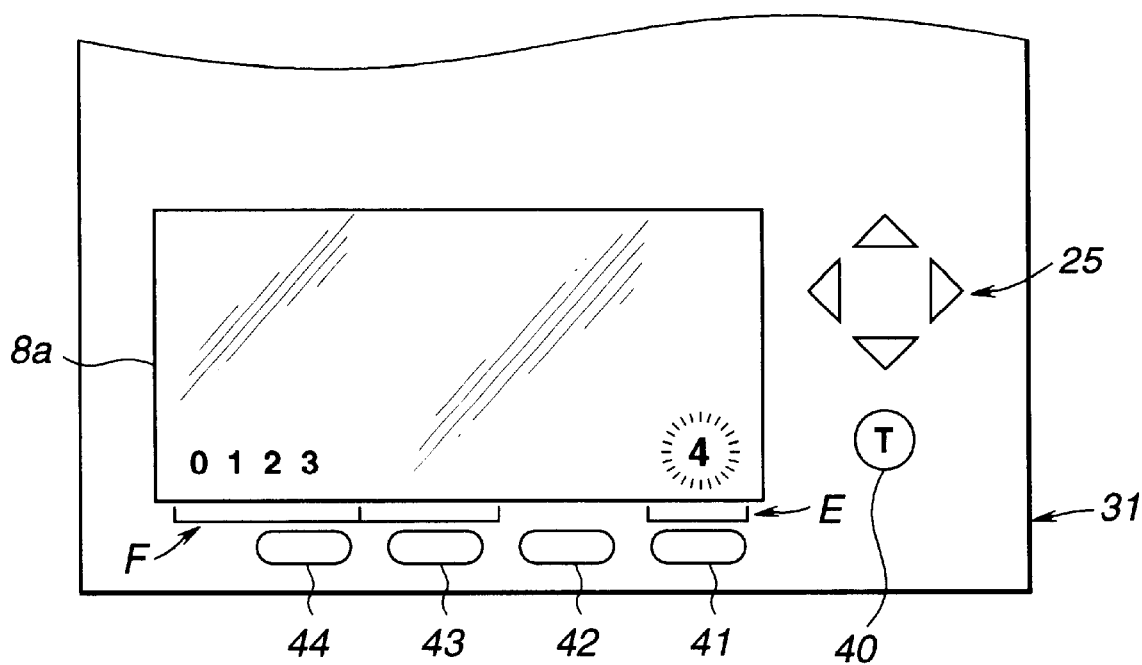
FIG. 12 is an upper view partially showing a main part of the electronic camera in FIG. 7, and is a view for explaining a concrete example of a telephone number input operation.

FIGS. 11 and 12 upper views partially showing a main part of the electronic camera 31 according to the second embodiment.

In the transmission mode in the electronic camera 31, when a telephone number is to be input, an operator operates the character selection key 44 first. The character selection key 44 is designed such that numbers from 1 to 9 can be sequentially displayed at a predetermined position (region E located at the lower right position of the LCD 8*a* in FIGS. 11 and 12) each time the character selection key 44 is pressed. At this time, a number displayed in the region E of the LCD 8*a* flickers to represent that the number is not fixed.

The operator presses the character selection key 44 to display a desired number on the LCD 8*a* and then presses the ENTER key 43 to fix the number. At this time, at another predetermined position (region F located at the lower left position of the LCD 8*a*), the fixed number is displayed while the number flickers. The state shown in FIG. 12 represents a state obtained after numbers of the first to fourth digits are input, and a four-digit number is fixed.

With the above arrangement, the operator displays all the digits of the telephone number in the region F of the LCD 8*a* to set the desired telephone number. Finally, the operator presses the video trigger key 40 (see step S36 in FIG. 9), so that telephone number information and an outgoing instruction are transmitted to the PC-card-type telephone set (22). In this manner, the telephone number input operation is completed.

Figure 13:
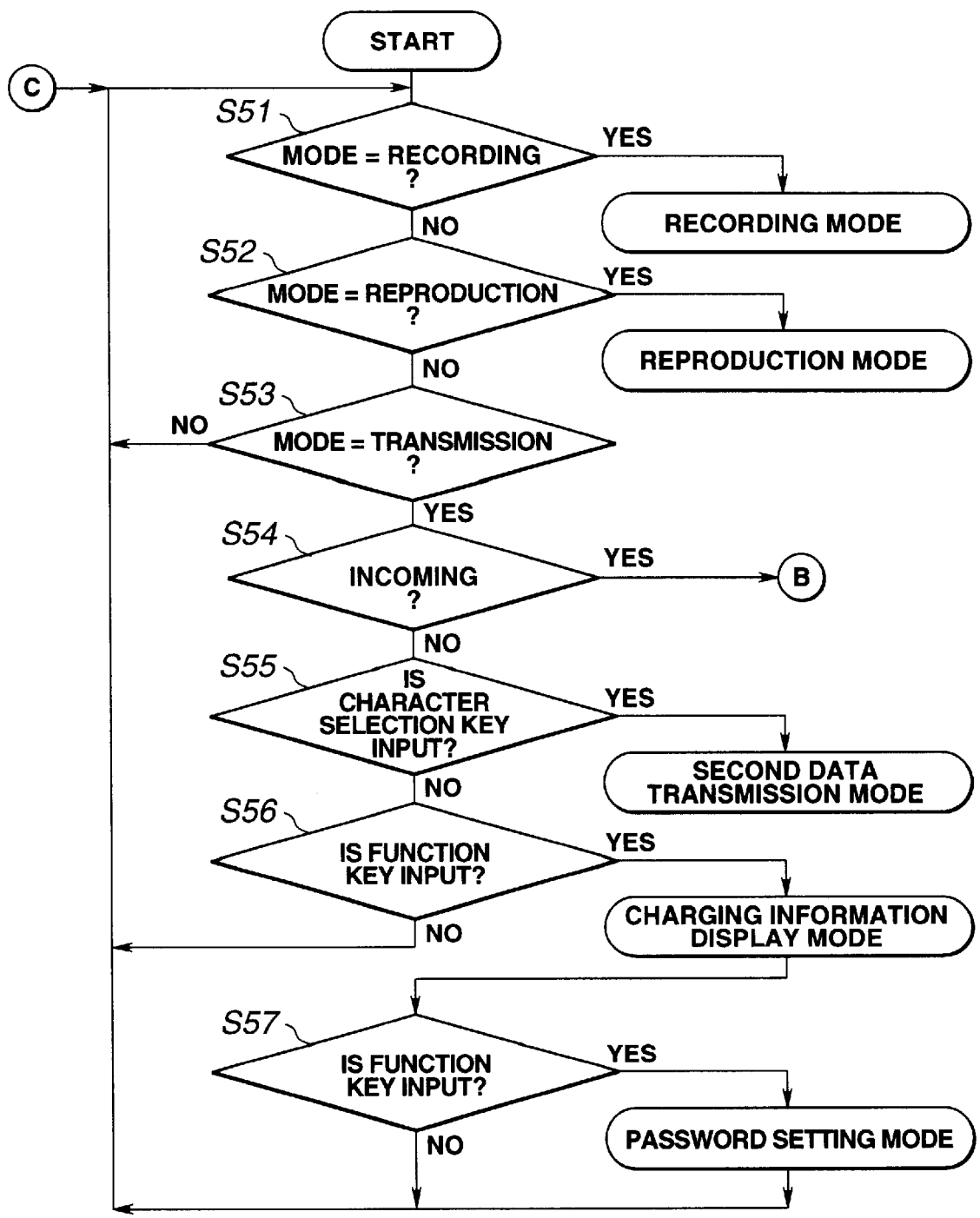
FIG. 13 is a flow chart showing the operation of a transmission mode of the electronic camera in FIG. 7 in detail.

FIG. 13 is a flow chart obtained when a sub-mode such as a charging information display mode or a password setting mode is added to the transmission mode, and shows the operation of the transmission mode in detail.

In steps S51 to S53, an operation mode is determined. However, the determination operation is the same as that in steps S31 to S33 in the operation sequence shown in FIG. 9 described above. Therefore, in this case, an operation mode determination sequence will be omitted.

If it is determined that the transmission mode is selected in step S53 in FIG. 13, and the flow shifts to the process in next step S54. In this case, in step S54, the CPU 1 monitors the PC-card-type telephone set (22) to check whether the PC-card-type telephone set (22) receives an incoming signal, e.g., a character string signal such as "RING" or "CALL". At this time, if the incoming signal is detected, the flow shifts to the process in step S65 (symbol B, see FIG. 16) in the second transmission mode (to be described later). If the incoming signal is not detected, the flow shifts to the process in next step S55.

In step S55, the CPU 1 checks whether the character selection key 44 is operated by the operator. If an input signal from the character selection key 44 is detected, i.e., if a telephone number input operation is performed by the operator, the flow shifts to the second data transmission mode (see FIG. 16).

If the input signal from the character selection key 44 is not detected in step S55, the flow shifts to the process in next step S56.

In step S56, the CPU 1 checks whether the function key 41 is operated by the operator. If an input signal from the function key 41 is detected, the flow shifts to the charging information display mode (see the explanation in FIG. 10). After the process in the charging information display mode is executed, in step S57, it is checked whether the function key 41 is operated by the operator again. If the input signal from the function key 41 is detected again, the flow shifts to the password setting mode. If the password setting mode is ended, the flow returns to the process in step S51 described above, and the subsequent processes are repeated.

In each of step S56 and step S57 described above, if the input signal from the function key 41 is not detected, and if an input signal from the MODE key 42 or the like is detected, the flow returns to the process in step S51 described above, and the subsequent processes are repeated.

Figure 14:
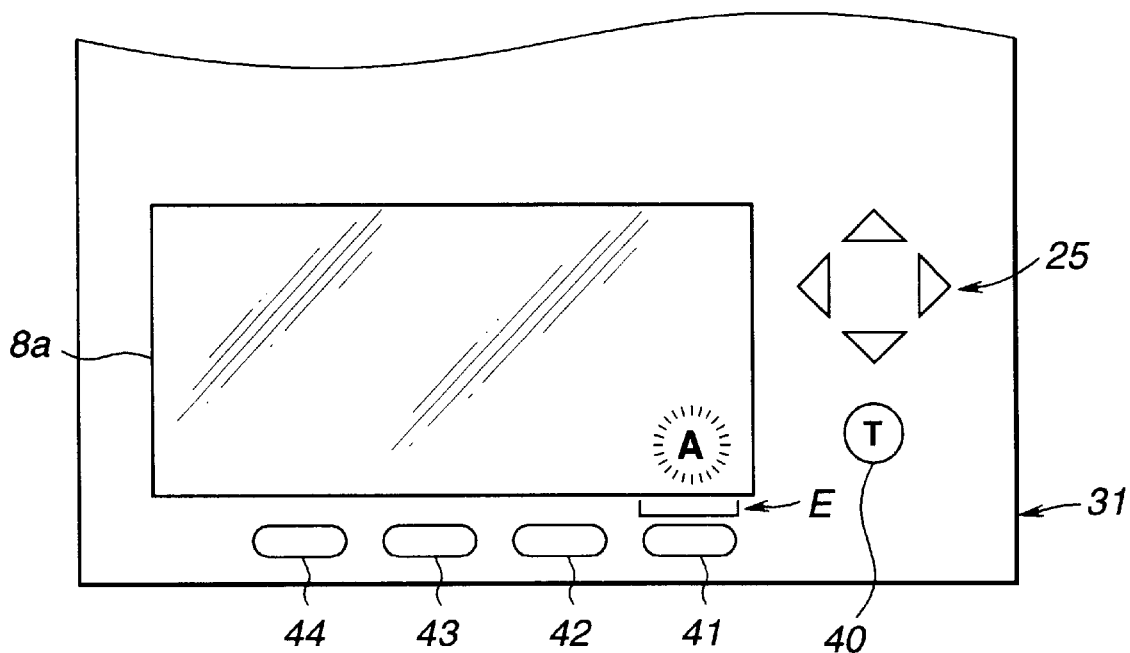
FIG. 14 is an upper view partially showing a main part of the electronic camera in FIG. 7, and is a view for explaining the procedure of a setting operation in the password setting mode.
Figure 15:
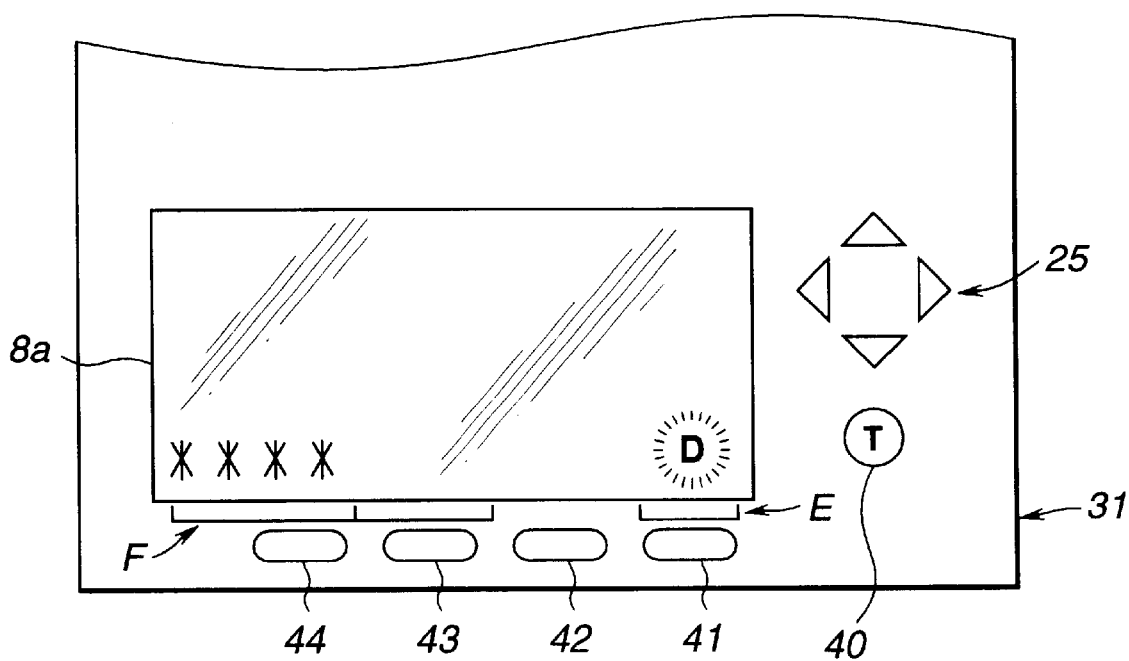
FIG. 15 is an upper view partially showing a main part of the electronic camera in FIG. 7, and is a view for explaining the procedure of a setting operation in the password setting mode.

FIGS. 14 and 15 are upper views partially showing a main part of the electronic camera 31 according to the second embodiment and illustrates the LCD 8*a* and operation keys. The procedure of a setting operation in the sequence of the password setting mode in step S57 described above will be described below with reference to FIGS. 14 and 15.

In the password setting mode, when an operator sets a password, the operator operates the character selection key 44 first. The character selection key 44 is designed such that numbers from 1 to 9 and English letters such as the alphabet from a to z can be sequentially displayed at a predetermined position (region E located at the lower right position of the LCD 8*a* in FIGS. 14 and 15) each time the character selection key 44 is pressed. At this time, a number or an English letter displayed in the region E of the LCD 8*a* flickers to represent that the number or the English letter is not fixed.

The operator presses the character selection key 44 to display a desired number or an English letter in the region E of the LCD 8*a* and then presses the ENTER key 43 to fix the input letter. When the ENTER key 43 is pressed, the fixed number or English letter is displayed at another position (region F located at the lower left position of the LCD 8*a*), the fixed number or English letter is displayed while the number or letter flickers. The state shown in FIG. 15 represents a state wherein a four-digit input character is fixed. In this case, since this screen is to set a password, security is required. Therefore, actually input numbers and English letters are not directly displayed on the LCD 8*a*, but substitutional characters "*" whose number corresponding to the number of digits of the input characters are displayed.

In this manner, the operator operates the character selection key 44 and the ENTER key 43 to input the all-digit password corresponding to the set password in the SIM 9 to the region F of the LCD 8*a*, thereby setting the password. When the operator presses the video trigger key 40 at the end, a character signal of the input password is stored in the RAM 4 or the like. In this manner, the password setting/registering operation is completed.

Figure 16:
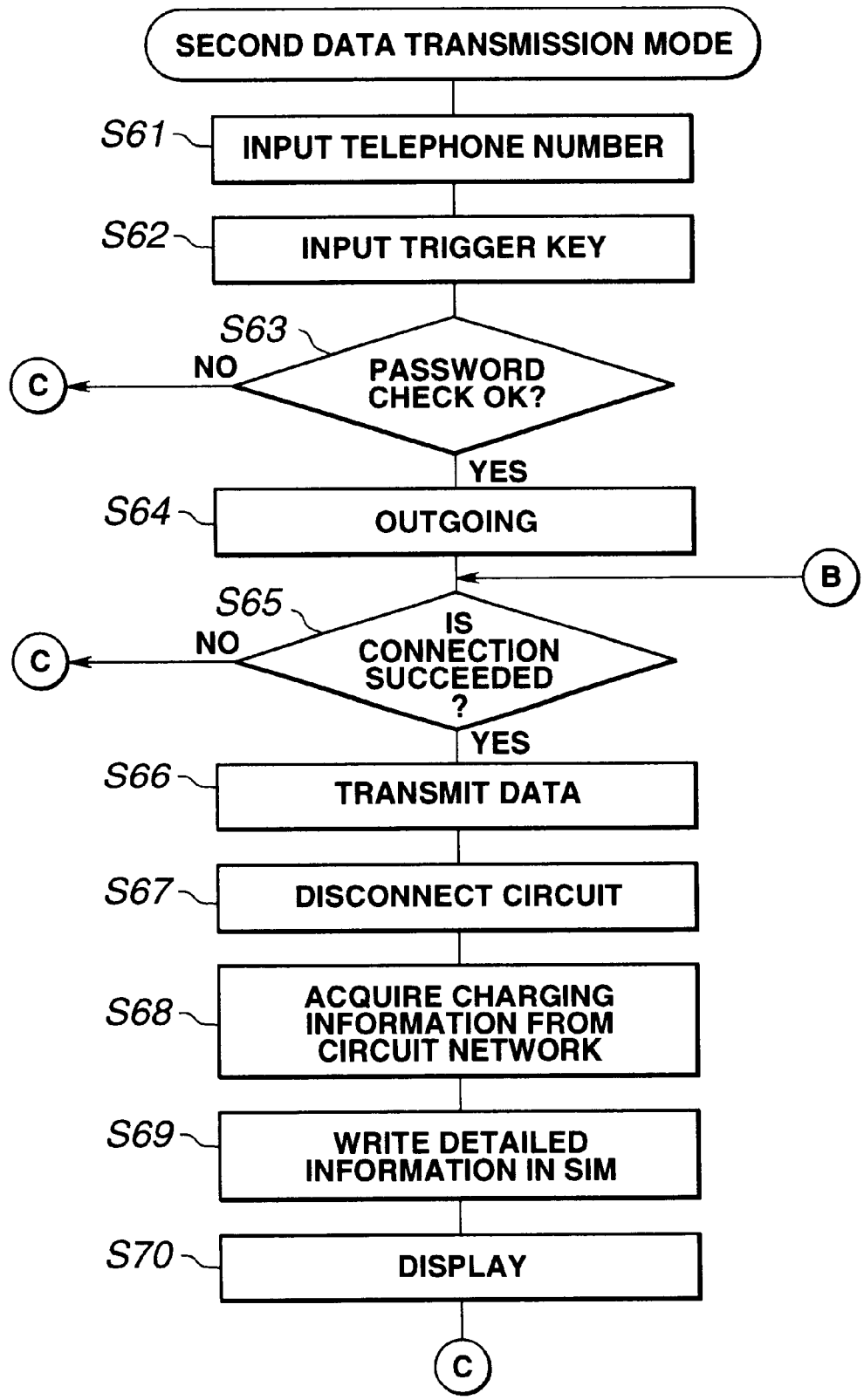
FIG. 16 is a flow chart showing the operation of the second data transmission mode of the electronic camera in FIG. 7.

FIG. 16 is a flow chart showing the operation of the second data transmission mode in FIG. 13 described above. Although the second data transmission mode is almost the same as the sequence following step S35 in the transmission mode in FIG. 9, the second data transmission mode is different from the transmission mode in FIG. 9 except that a sequence for password check is added as in the first embodiment.

Prior to the second data transmission mode, an operator sets and registers a password in a password setting mode by the procedure described by using FIGS. 14 and 15.

In step S55 in FIG. 13 described above, the character selection key 44 is operated to perform a telephone number input operation, and, at the same time, the flow shifts to the second data transmission mode. The telephone number input operation performed at this time (step S61) is executed by the procedure described by using FIGS. 11 and 12. If the video trigger key 40 is pressed (step S62), in response to this, the CPU 1 performs password check in step S63. If the password in the SIM 9 coincides with a password which is registered in advance, the flow shifts to the process in next step S64. In step S64, the CPU 1 transmits an input telephone number and an outgoing instruction to the PC-card-type telephone set (22) through the PC card I/F 5. In this manner, the PC-card-type telephone set (22) performs an outgoing operation. The flow shifts to the process in next step S65.

If the passwords do not coincide with each other as the result of the password check in step S63 described above, the flow returns to the process in step S51 in FIG. 13, and the subsequent processes are repeated.

In step S65, it is determined whether connection to a communication destination is succeeded. If a character string signal such as "connect" is transmitted from the PC-card-type telephone set (22) to the CPU 1, the CPU 1 determines that the connection to the communication destination is succeeded, and the flow shifts to the process in next step S66. In step S66, the CPU 1 performs data communication with the communication destination. The processes in steps S66 to S70 are the same as the processes in steps S39 to S43 in FIG. 9.

If a character string signal such as "fail" is transmitted from the PC-card-type telephone set (22) to the CPU 1 in step S65 described above, the CPU 1 determines that connection to the communication destination fails, the flow shifts to the process in step S51 described above, and the subsequent sequence is repeated.

In step S70, when a display to the LCD 8*a* is made, the sequence of the second data transmission mode is ended. The flow returns to the process in step S51 described above, and the subsequent processes are repeated.

As described above, according to the second embodiment, even in an electronic camera being capable of transmitting photographed image data or the like to a communication destination, the same advantage as in the first embodiment can be obtained.

Figure 17:
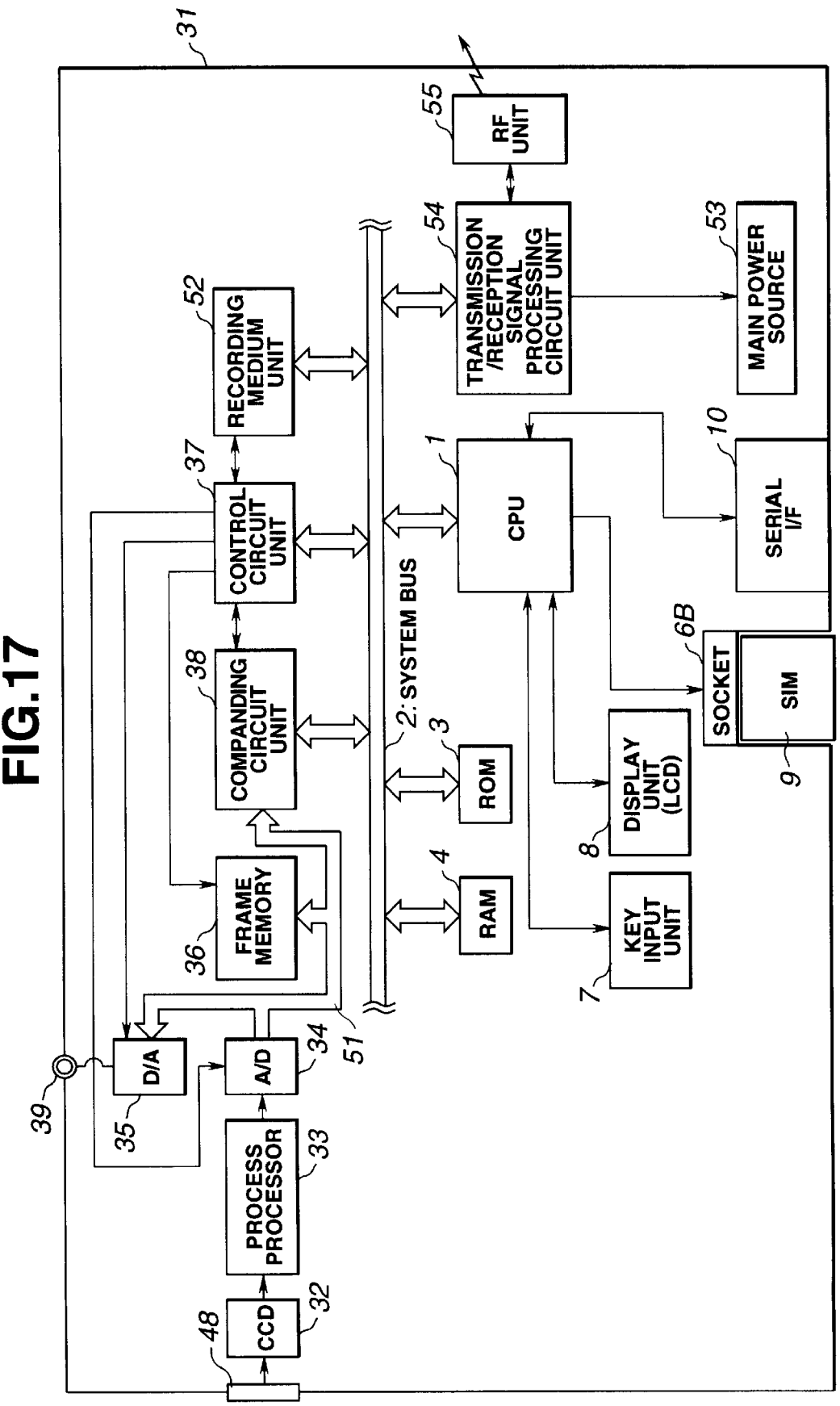
FIG. 17 is a block diagram showing an electronic camera according to the third embodiment of the present invention.

FIG. 17 is a block diagram showing an electronic camera according to the third embodiment of the present invention. The third embodiment has an arrangement which is basically the same as that of the second embodiment except for the following point. That is, in the third embodiment, a main power source 53, a transmission/reception signal processing circuit unit 54, an RF unit 55, and the like are additionally arranged in the second embodiment.

More specifically, in the electronic camera 31 according to the third embodiment, the RF unit 55 is incorporated in place of the PC-card-type telephone set (22), so that communication using radio wave for a public telephone network can be independently performed by the electronic camera 31. Therefore, the same reference numerals as in the second embodiment denote the same components in the third embodiment, and a description thereof will be omitted. Only different components will be described below.

The recording medium unit 52 is connected to the CPU 1 through the system bus 2 to be controlled by the CPU 1. At the same time, the recording medium unit 52 is connected to the control circuit unit 37 through a control line. When a recording/reproduction operation of image data or the like is performed, the recording medium unit 52 is controlled by the control circuit unit 37.

As the recording medium unit 52 may be incorporated in the device or may be detachably arranged to the device. For example, a storage device such as a floppy disk device, an optical disk device, or a hard disk device can be employed.

The communication operation of the electronic camera 31 is performed by the RF unit 55 serving as a communication means controlled by the CPU 1 through the transmission/reception signal processing circuit unit 54. The RF unit 55 is constituted by a member and a circuit such as an antenna related to communication. A video signal such as image data or the like transmitted/received by the RF unit 55 is subjected to signal processing by the transmission/reception signal processing circuit unit 54.

The transmission/reception signal processing circuit unit 54 is connected to the CPU 1 through the system bus 2 to be controlled by the CPU 1. The RF unit 55 is connected to the transmission/reception signal processing circuit unit 54 through an analog signal line.

The transmission/reception signal processing circuit unit 54 is connected to the main power source 53 through a power supply control line 71, and the main power source 53 is controlled by the transmission/reception signal processing circuit unit 54.

In the electronic camera 31 according to the third embodiment, as in the second embodiment (see FIG. 7) described above, a camera unit is arranged. An object image focused by the photographing optical system 48 of the camera unit is optical-electric-converted as a video signal by the CCD 32, and the video signal is output to the A/D converter 34 through the process processor 33. The video signal is converted into a digital signal by the A/D converter 34, and the digital signal is output to the companding circuit unit 38 through the video bus 51. The video signal (digital image data) subjected to a compressing process is input to the CPU 1 through the system bus 2. The video signal is output from the CPU 1 to the transmission/reception signal processing circuit unit 54 through the system bus 2.

The transmission/reception signal processing circuit unit 54 performs transmission signal processing such as error correction or D/A conversion to the video signal (digital) output from the CPU 1, and the video signal is output to the RF unit 55 as an analog data signal. Of analog signals received by the RF unit 55 and input to the transmission/reception signal processing circuit unit 54, a video signal (analog) such as image data transmitted from the communication destination is subjected to reception signal processing such as A/D conversion or decoding of error correction. The video signal is output as a digital data signal.

As described above, various analog signals received by the RF unit 55 are input to the transmission/reception signal processing circuit unit 54. The analog signals received by the RF unit 55 are radio signals for a public telephone network. The RF unit 55 performs an orthogonal demodulation process or the like to the analog signal to output the signal to the transmission/reception signal processing circuit unit 54 as an analog data signal. At the same time, the analog data signal is output from the transmission/reception signal processing circuit unit 54, and the analog data signal input to the RF unit 55 is subjected to orthogonal modulation processing or the like. In this manner, a video data such as image data or the like in communication performed by the electronic camera 31 is output as the radio signal for the public telephone network.

When the signal received by the RF unit 55 and transmitted from the transmission/reception signal processing circuit unit 54 is an incoming signal, the transmission/reception signal processing circuit unit 54 outputs a character string signal such as "RING" or "CALL" to the CPU 1. In response to the character string signal, the CPU 1 displays a character string or the like representing the incoming signal on the display unit (LCD) 8.

The transmission/reception signal processing circuit unit 54 has a so-called incoming wakeup (WakeUp) function in which, when the RF unit 55 receives the incoming signal, if the main power source 53 of the electronic camera 31 is in an OFF state, the transmission/reception signal processing circuit unit 54 receives the incoming signal to set the main power source 53 connected by the power supply control line 71 in an ON state. Therefore, the electronic camera 31 has a mode (to be referred to as an incoming wakeup mode hereinafter) in which an incoming signal is always monitored by the CPU I even if the main power source 53 is in an OFF state.

In addition, the transmission/reception signal processing circuit unit 54 performs a circuit connection process under the control of the CPU 1. In the circuit connection process, in a communication operation, when a signal representing that connection to a communication destination is succeeded is received by the RF unit 55, and the signal is transmitted to the transmission/reception signal processing circuit unit 54, the transmission/reception signal processing circuit unit 54 outputs a character string signal such as "connect" to the CPU 1. When a signal representing that the connection to the communication destination fails, and the signal is transmitted to the transmission/reception signal processing circuit unit 54, the transmission/reception signal processing circuit unit 54 outputs a character string signal such as "fail" to the CPU 1.

Figure 20:
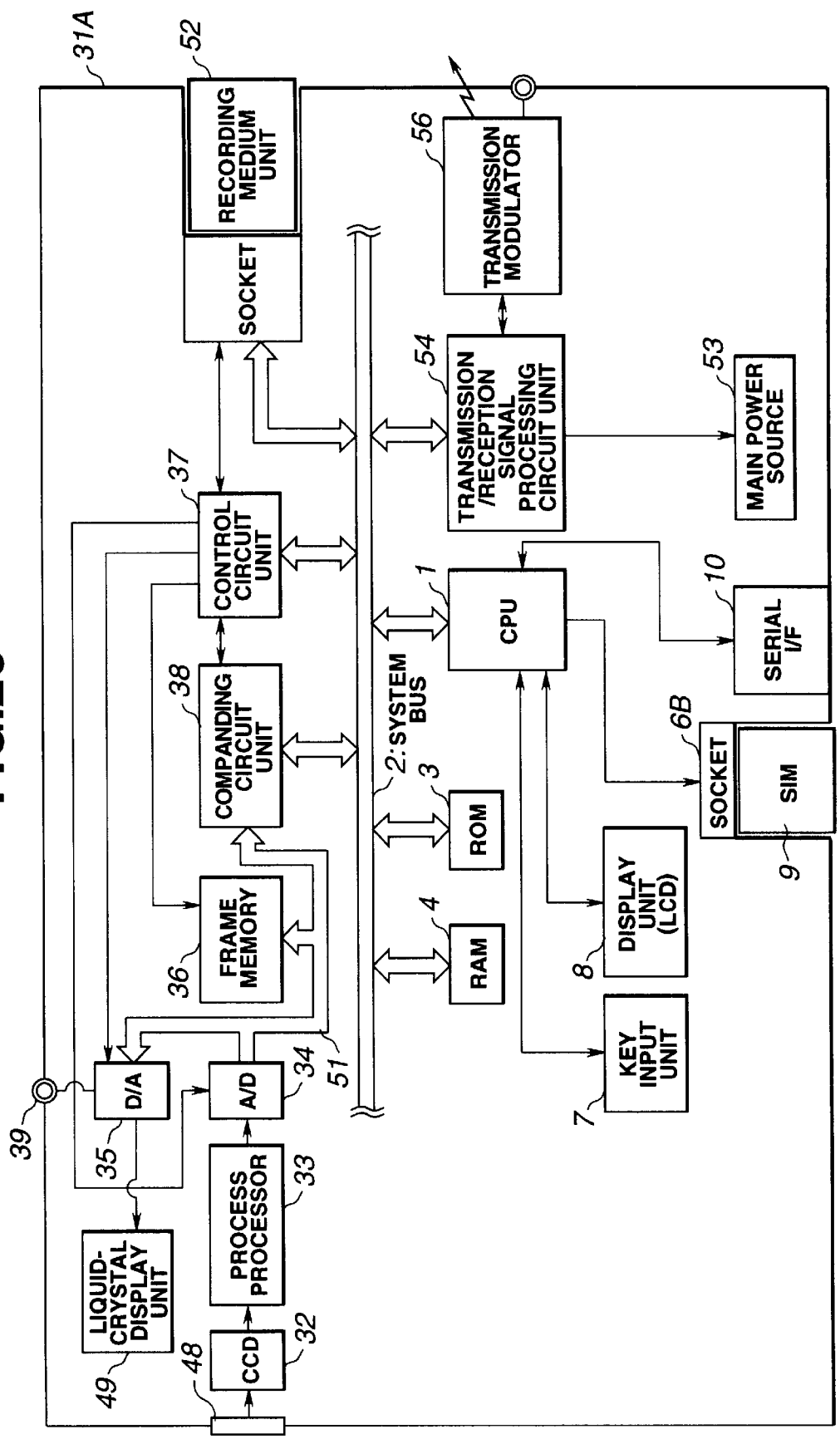
FIG. 20 is a block diagram showing a modification of the electronic camera in FIG. 17.

FIG. 20 is a block diagram showing a modification of the electronic camera according to the third embodiment and corresponds to FIG. 17. In this modification, as shown in FIG. 20, a video signal output from the D/A converter 35 and converted into an analog signal is output to the video signal output terminal 39 for outputting a signal to an external display device, and is output to a liquid-crystal display unit 49 arranged inside the electronic camera 31. In this manner, even in the liquid-crystal display unit 49 incorporated in this electronic camera 31 A, a corresponding image can be displayed.

As the recording medium unit 52, as shown in FIG. 20, a card-shaped medium which can be detachably fixed to the card socket is used. For example, a PC card, a SmartMedia, a CompactFlash card, a MiniatureCard, or the like is used.

In addition, as shown in FIG. 20, in place of the RF unit 55 in FIG. 17, a transmission modulator 56 having a radio communication modulation circuit for performing modulation suitable for radio communication, a wired communication modulation circuit for performing modulation suitable for wired communication, and a switching unit for performing a properly switching operation between the radio communication modulation circuit and the wired communication modulation circuit, so that communication using a public telephone network is performed such that the radio communication and the wired communication are properly switched to each other.

Figure 18:
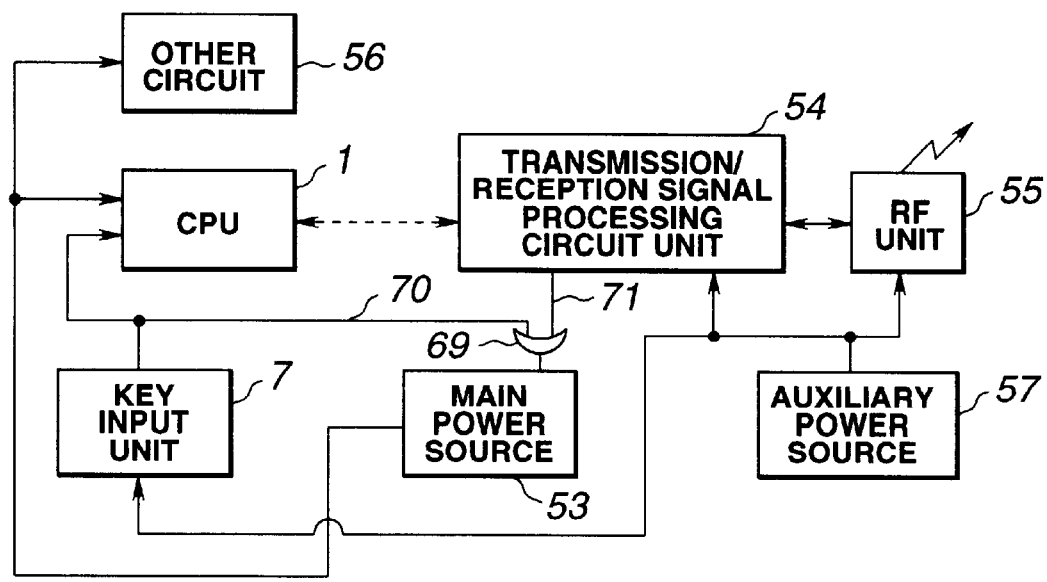
FIG. 18 is a block diagram related to a power supply control system in the electronic camera in FIG. 17.

FIG. 18 is a block diagram related to a power source control system in the electronic camera 31 according to the third embodiment.

The arrangement of the electronic camera 31 is constituted by the main power source 53 for supplying power to the whole of the electronic camera 31 and an auxiliary power source 57 for always supplying power to some circuit of the electronic camera 31 through an auxiliary power source line.

The transmission/reception signal processing circuit unit 54, the RF unit 55, and the key input unit 7 are connected to the auxiliary power source 57.

The main power source 53 and the transmission/reception signal processing circuit unit 54 are connected by the power supply control line 71 through an OR element 69. A power source key (POWER key 58; see FIG. 19 (to be described later)) serving as a main power source switch for the main power source 53 and the key input unit 7 is connected by the power source switch signal line 70 through the OR element 69, and the power source key (58) is also connected to the CPU 1 by the power source switch signal line 70.

As described above, assume that the electronic camera 31 is set in an incoming wakeup mode (at this time, the main power source 53 is set in an OFF state). In this case, when the RF unit 55 receives an incoming signal, in response to this, the transmission/reception signal processing circuit unit 54 sets the power supply control line 71 in an active state. In this manner, the OR element 69 outputs a power source ON signal to the main power source 53.

The power source switch signal line 70 becomes active by pressing the power source key (58) of the key input unit 7 by an operator, so that a power source ON signal is output from the OR element 69 to the main power source 53.

In this manner, the main power source 53 is ON/OFF-controlled by an output signal from the OR element 69. When the main power source 53 is turned on, the CPU 1 and all the other circuits of the electronic camera 31 receive power through the main power source line.

When the incoming wakeup mode is set, and the main power source 53 is turned on by the incoming signal, the operation is performed by the same sequence as that of the processes in the steps following step S65 in the second transmission mode shown in FIG. 16.

Figure 19:
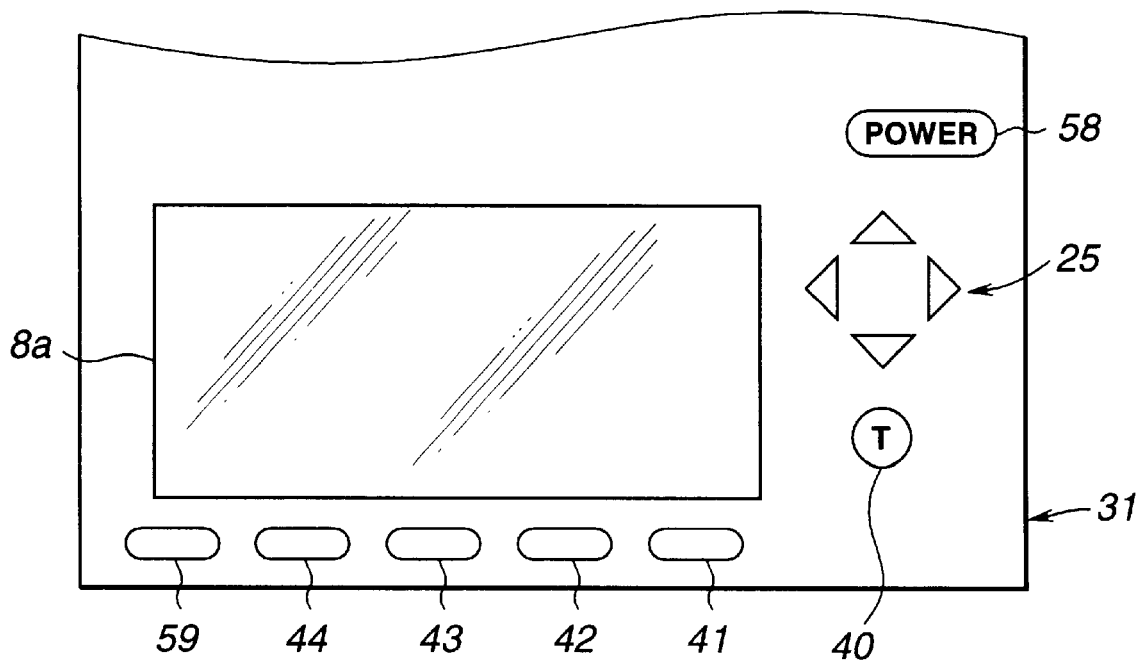
FIG. 19 is a plan view of a main part of the electronic camera in FIG. 17.

In the electronic camera 31 according to the third embodiment, as shown in the plan view of the main part in FIG. 19, the power source key 58 and the sleep key 59 are arranged as the key input unit 7 in place of the key input unit 7 according to the second embodiment described above.

The power source key 58 is an operation key used when the power source switch signal line 70 is made active by a pressing operation of the operator to set the main power source 53 in an ON state. When the main power source 53 is set in an ON state, and the operator presses the power source key 58, the power source switch signal line 70 receives the input signal to be inactive, so that the main power source 53 is turned off.

The sleep key 59 is an operation key for setting an outgoing wakeup mode. When the sleep key 59 is pressed by the operator when the electronic camera 31 is in the transmission mode, the input signal is input to the CPU 1. In response to this, the CPU 1 controls the transmission/reception signal processing circuit unit 54 to set the incoming wakeup mode. In this state, when the power source key 58 is pressed by the operator to set a power-source OFF state, the CPU 1 begins to monitor the incoming signal, and the transmission/reception signal processing circuit unit 54 is set in a standby state for an incoming signal from the RF unit 55.

When the RF unit 55 receives an incoming signal, as described above, the main power source 53 is automatically turned on to execute the processes of the subsequent transmission mode (processes in the steps following step S65 in FIG. 16). The recording medium unit 52 arranged in the third embodiment may be a PC card or a flash memory.

In the third embodiment arranged as described above, when the RF unit 55 is incorporated in the electronic camera 31, an electronic camera which can independently perform data communication using radio wave for a public telephone network can be obtained.

Figure 21:
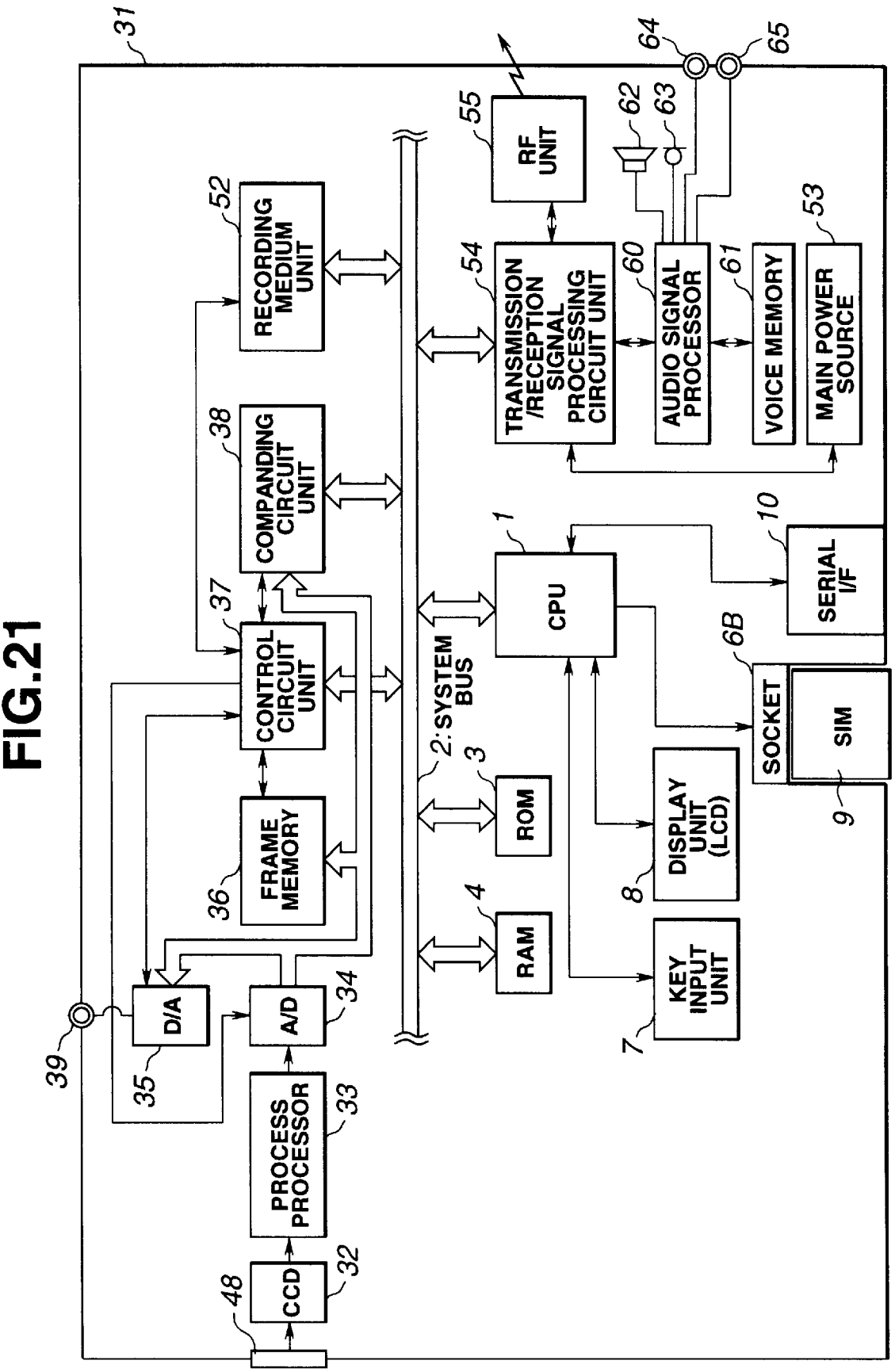
FIG. 21 is a block diagram showing an electronic camera according to the fourth embodiment of the present invention.

FIG. 21 is a block diagram showing an electronic camera according to the fourth embodiment of the present invention. The fourth embodiment has an arrangement which is basically the same as that of the first or second embodiment. However, in the fourth embodiment, an audio signal processor 60, a voice memory 61, a loudspeaker output unit 62, a microphone input unit 63, a voice line input terminal 64, a voice line output terminal 65, and the like are additionally arranged. The electronic camera is designed such that not only a video signal such as image data but also an audio signal can be recorded and reproduced.

More specifically, the audio signal processor 60 for various processing to an audio signal is connected to the transmission/reception signal processing circuit unit 54 by an audio signal line, and the voice memory 61 serving as a work memory is also connected to the audio signal processor 60 by an audio signal line.

The microphone input unit 63 and the voice line input terminal 64 serving as voice input units to which an external audio signal is input and the loudspeaker output unit 62 and the voice line output terminal 65 serving as voice output units which output an audio signal subjected to signal processing by the audio signal processor 60.

To the audio signal processor 60, only an audio signal of data signals including an audio signal transmitted from the communication destination, received by the RF unit 55, and input to the transmission/reception signal processing circuit unit 54 is input from the transmission/reception signal processing circuit unit 54. Since the audio signal is an encoded signal, the audio signal is decoded by the audio signal processor 60, and the decoded audio signal is converted into an analog signal. The audio signal (analog) is output outside from the loudspeaker output unit 62 or the voice line output terminal 65.

To the audio signal processor 60, an audio signal can be directly input from the microphone input unit 63 or the voice line input terminal 64. Since the audio signal input at this time is an analog signal, the audio signal is subjected to signal processing by the audio signal processor 60 to have a form suitable for recording on the recording medium unit 52.

More specifically, the audio signal input to the audio signal processor 60 is converted into a digital signal in the audio signal processor 60 by the microphone input unit 63, the voice line input terminal 64, or the like to be coded. The encoded audio signal is output to the transmission/reception signal processing circuit unit 54 and output to the recording medium unit 52 through the system bus 2 to be stored in the recording medium unit 52.

In the audio signal processor 60, when processing of the audio signal is performed, the voice memory 61 is used as a work memory, so that audio signal processing is efficiently performed.

Figure 27:
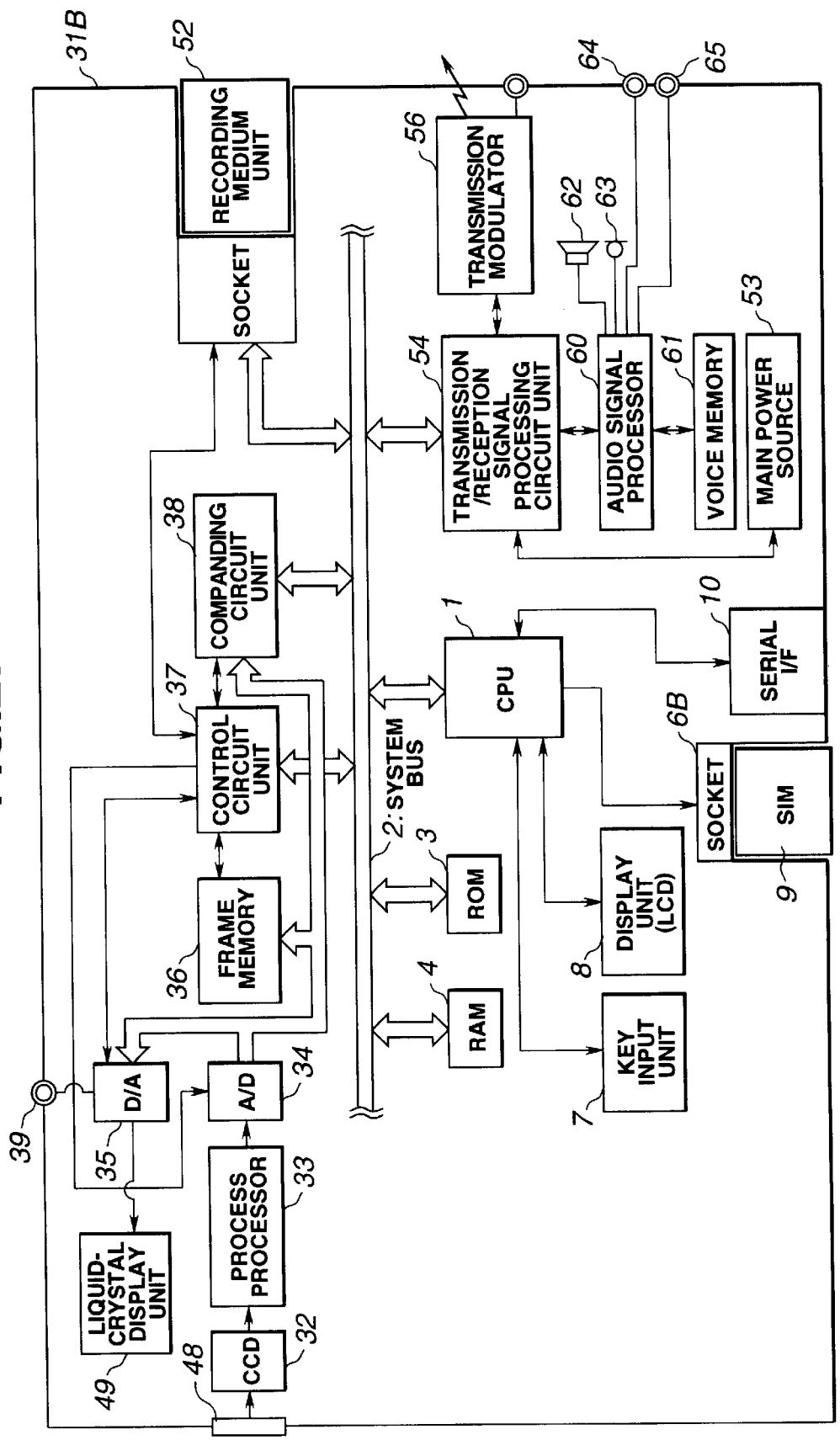
FIG. 27 is a block diagram showing a modification of the electronic camera in FIG. 21.

FIG. 27 is a block diagram showing a modification of an electronic camera according to the fourth embodiment, and corresponds to FIG. 21. In this modification, as shown in FIG. 27, a video signal output from the D/A converter 35 and converted into an analog signal is output to the video signal output terminal 39 for outputting the signal to the external display device and output to the liquid-crystal display unit 49 arranged inside the electronic camera 31. In this manner, also in the liquid-crystal display unit 49 incorporated in the electronic camera 31B, a corresponding image can be displayed.

As the recording medium unit 52 has, as shown in FIG. 27, a card-shaped medium which can be detachably fixed to the card socket is used. For example, a PC card, a SmartMedia, a CompactFlash card, a MiniatureCard, or the like is used.

In addition, as shown in FIG. 27, in place of the RF unit 55 in FIG. 21, a transmission modulator 56 having a radio communication modulation circuit for performing modulation suitable for radio communication, a wired communication modulation circuit for performing modulation suitable for wired communication, and a switching unit for performing a properly switching operation between the radio communication modulation circuit and the wired communication modulation circuit, so that communication using a public telephone network is performed such that the radio communication and the wired communication are properly switched to each other.

Figure 22:
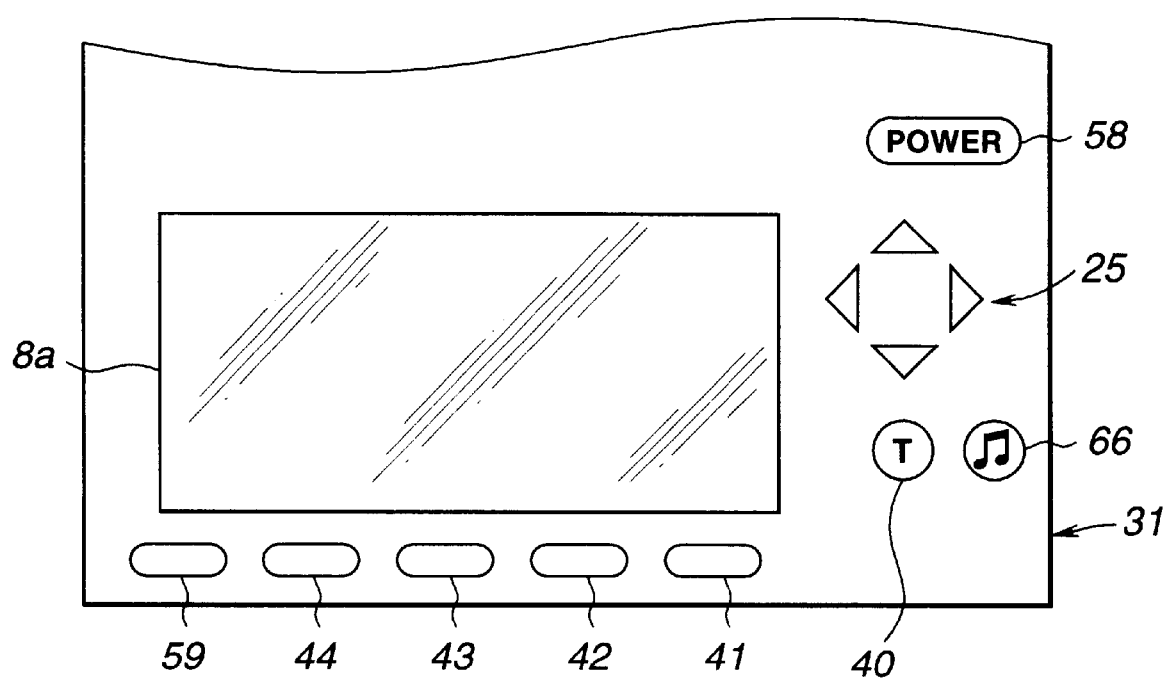
FIG. 22 is a plan view of a main part of the electronic camera in FIG. 21.

In the electronic camera 31 according to the fourth embodiment, as shown in the plan view of the main part in FIG. 22, a voice trigger key 66 serving as a voice recording designation means is additionally arranged in the third embodiment as the key input unit 7. The voice trigger key 66 is an operation key operated when recording, reproduction, or the like of an audio signal is performed by the electronic camera 31.

The operation of the electronic camera according to the fourth embodiment will be described below with reference to the flow charts in FIGS. 23 to 26. In the electronic camera 31 according to the fourth embodiment, in addition to a "recording mode", a "reproduction mode", and a "transmission mode" which are generally used, a "television telephone mode" using an audio signal is set. When an operator sequentially presses the MODE key 42 to select a desired operation mode.

Figure 23:
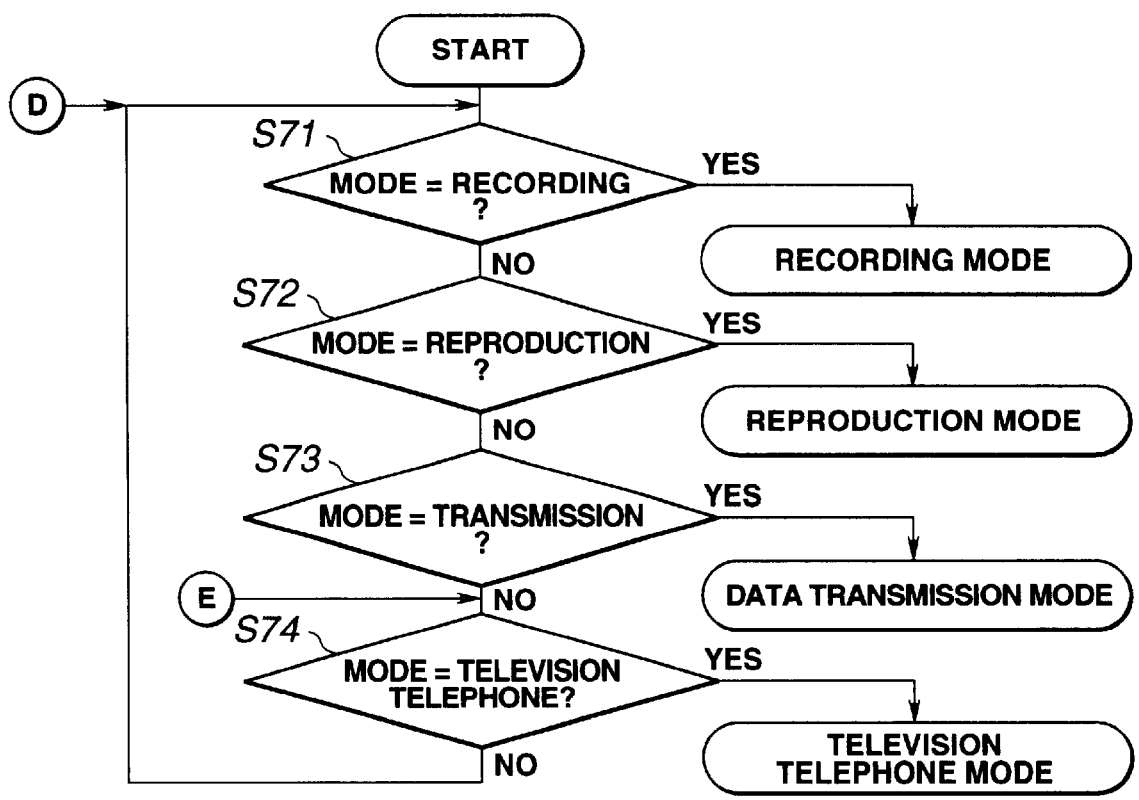
FIG. 23 is a flow chart showing an operation mode detection sequence in the electronic camera in FIG. 21.

FIG. 23 is a flow chart showing a detection sequence for detecting an operation mode in the electronic camera.

In steps S71 to S74, operation modes are determined. More specifically, an input signal from the MODE key 42 corresponding to an operation mode selected by the operator with the MODE key 42.

In step S71, it is determined whether the recording mode is selected. If it is determined that the recording mode is selected, the flow shifts to the sequence of the recording mode. If the recording mode is not selected, the flow shifts to the process in next step S72.

In step S72, it is determined whether the reproduction mode is selected. If it is determined that the reproduction mode is selected, the flow shifts to the sequence of the reproduction mode. If the reproduction mode is selected, the flow shifts to the process in next step S73.

In step S73, it is determined whether the transmission mode is selected. If it is determined that the transmission mode is selected, the flow shifts to the sequence of the data transmission mode. If the transmission mode is selected, the flow shifts to the process in next step S74.

In step S74, it is determined whether the television telephone mode is selected.

If it is determined that the television telephone mode is selected, the flow shifts to the television telephone mode. If the television telephone mode is not selected, it is determined that the MODE key 42 is not operated, and the flow returns to the initial state of the operation mode determination sequence. The processes in the steps following step S71 are repeated until any operation mode is selected by the operator.

Figure 24:
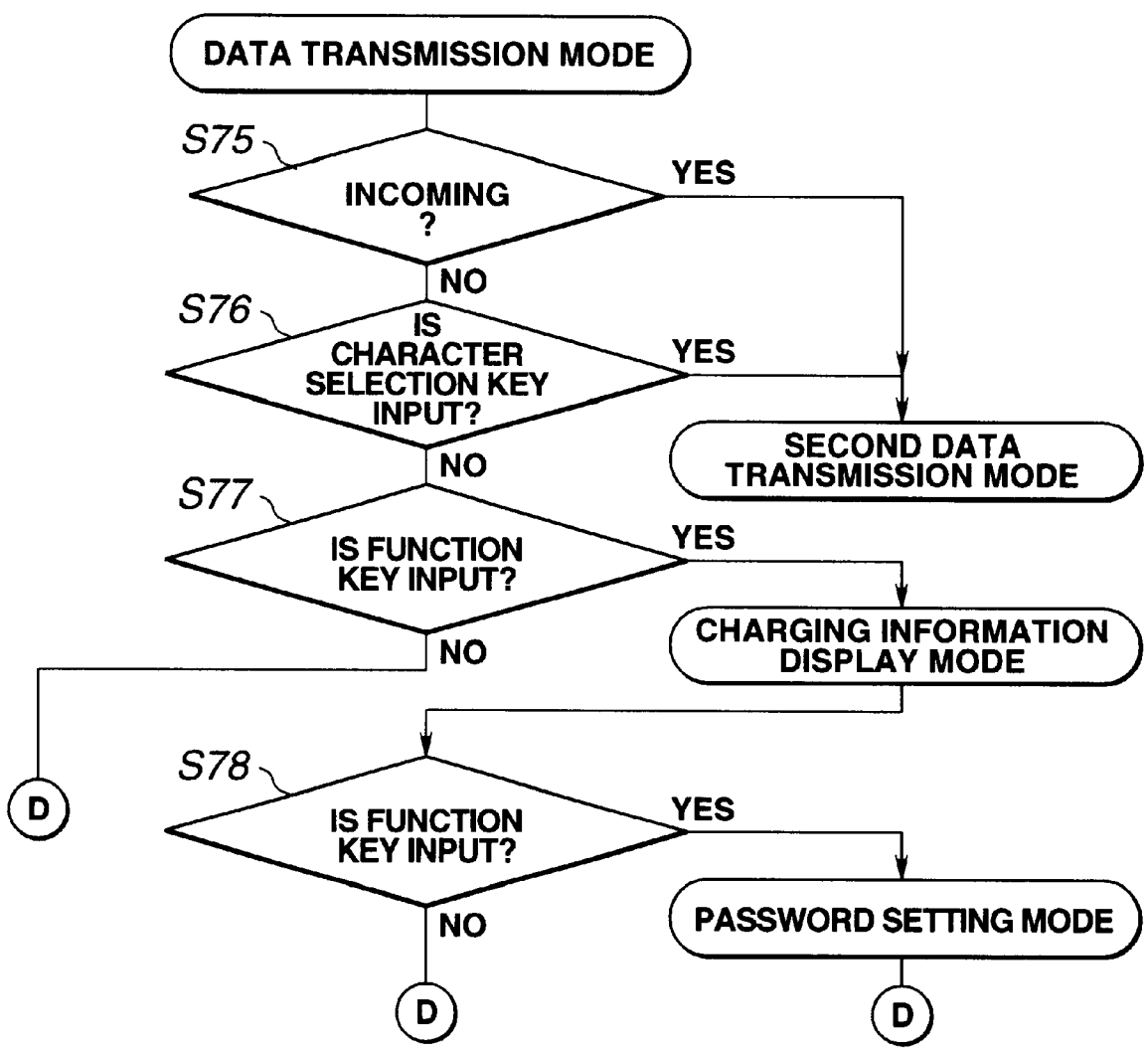
FIG. 24 is a flow chart of a data transmission mode in the electronic camera in FIG. 21.

FIG. 24 is a flow chart of the data transmission mode in the electronic camera.

In step S75, the CPU 1 monitors the RF unit 55 to check whether the RF unit 55 receives an incoming signal, i.e., a character string signal such as "RING" or "CALL" from the transmission/reception signal processing circuit unit 54. In this case, if the incoming signal is detected, the flow shifts to the second data transmission mode (as in the flow chart in FIG. 16). If the incoming signal is not detected, the flow shifts to the process in next step S76.

In step S76, detection of an input signal from the character selection key 44 is performed. If the character selection key 44 is operated by the operator (telephone number input operation is performed), and the input signal from the character selection key 44 is detected, the flow shifts to the second data transmission mode (see FIG. 16). If the input signal from the character selection key 44 is not detected, i.e., if the character selection key 44 is not operated, the flow shifts to the process in next step S77.

In step S77, detection of an input signal from the function key 41 is performed. In this case, if the function key 41 is operated by the operator, and the input signal from the function key 41 is detected, the flow shifts to a charging information display mode (see the explanation in FIG. 10).

In step S77 described above, if the input signal from the function key 41 is not detected, i.e., if the function key 41 is not operated, the flow returns to the process in step S71 (symbol D in FIG. 23) described above, the subsequent processes are repeated.

Upon completion of the charging information display mode, the flow shifts to next step S78. In step S78, it is checked whether the function key 41 is operated again. If an input signal from the function key 41 is detected, the flow shifts to the password setting mode (see explanation in FIGS. 14 and 15). Upon completion of the password setting mode, the flow returns to the process in step S71 described above (symbol D in FIG. 23), the subsequent processes are repeated.

If the input signal from the function key 41 is not detected, the flow instantaneously returns to the process in step S71 described above (symbol D in FIG. 23), and the subsequent processes are repeated.

Figure 25:
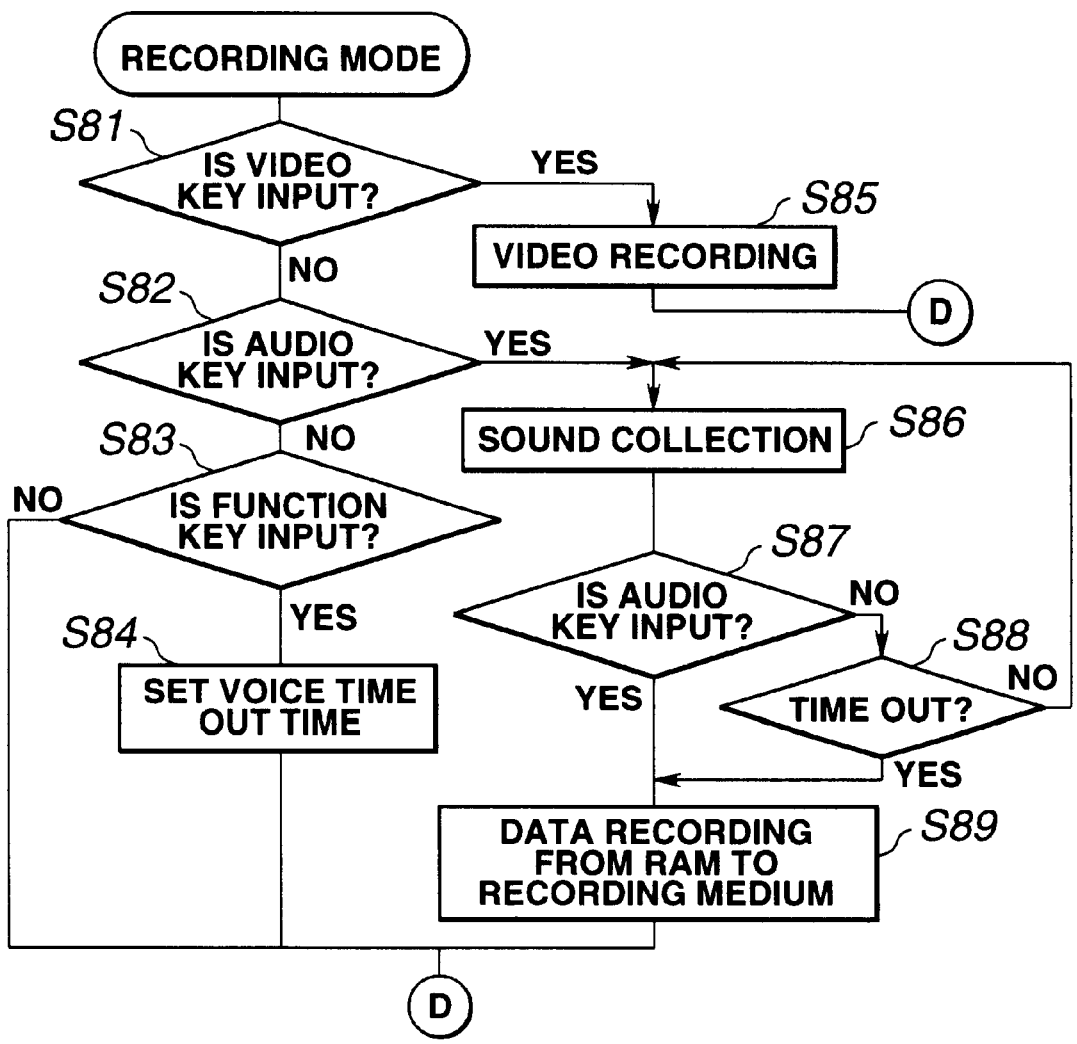
FIG. 25 is a flow chart of a recording mode in the electronic camera in FIG. 21.

FIG. 25 is a flow chart of the recording mode in the electronic camera.

In step S81, the CPU 1 performs detection of an input signal from the video trigger key 40. If the input signal from the video trigger key 40 is detected, it is determined that the video trigger key 40 is operated by an operator, and the flow shifts to the process in step S85. After a recording operation of a video signal (still image) is performed in step S85, the flow returns to step S71 described above (symbol D in FIG. 23), and the subsequent processes are repeated.

In step S81 described above, if the input signal from the video trigger key 40 is not detected, it is determined that the video trigger key 40 is not operated by the operator, and the flow shifts to the process in next step S82.

In step S82, the CPU 1 performs detection of an input signal from the voice trigger key 66. If the input signal from the voice trigger key 66 is detected, it is determined that the voice trigger key 66 is operated by the operator, and the flow shifts to the process in next step S86.

In step S86, a sound collecting operation for an audio signal is started. The CPU 1 receives an input signal from the voice trigger key 66 to transmit a sound correction instruction to the transmission/reception signal processing circuit unit 54. In response to this, the transmission/reception signal processing circuit unit 54 controls the audio signal processor 60 to perform a sound collecting operation with the microphone input unit 63 or the voice line input terminal 64. The collected audio signal is input to the audio signal processor 60. The audio signal processor 60, as described above, converts the input audio signal into a digital signal and encodes the audio signal. The encoded audio signal (digital) is output to the transmission/reception signal processing circuit unit 54 and output to the CPU 1 through the transmission/reception signal processing circuit unit 54. In addition, the CPU 1 outputs the audio signal to the RAM 4 through the system bus 2 to temporarily stores the audio signal in the RAM 4.

In this sound collecting operation, the CPU 1 monitors the input signal from the voice trigger key 66 (step S87). The following of the input signal from the voice trigger key 66 in step S82 described above is continued until the voice trigger key 66 is operated again to detect an input signal or until a predetermined period of time has elapsed (step S88 in which time out is determined).

When the input signal from the voice trigger key 66 in step S87 is detected, the sound collecting operation is ended, and the flow shifts to next step S89. The input signal from the voice trigger key 66 is not detected in step S87 described above, and the flow shifts to step S88. If the predetermined period of time has elapsed to detect time out, the sound collecting operation is ended, and the flow similarly shifts to next step S89.

In step S89, the CPU 1 reads an audio signal (digital) temporarily stored in the RAM 4 during the sound collecting operation, outputs the audio signal to the recording medium unit 52 through the system bus 2, and writes the audio data as an audio data file. The flow returns to the process in step S71 described above (symbol D in FIG. 23), and the subsequent processes are repeated.

If the input signal from the voice trigger key 66 is detected in step S82 described above, it is determined that the voice trigger key 66 is not operated, and the flow shifts to next step S83.

In step S83, the CPU 1 detects an input signal from the function key 41. If the input signal from the function key 41 is detected, the flow shifts to the process in next step S84. If the input signal from the function key 41 is not detected, the flow returns to the process in step S71 described above (symbol D in FIG. 23), and the subsequent processes are repeated.

In step S84, the operator can set voice time out time. The voice time out time is set by using the character selection key 44 and the ENTER key 43. The setting procedure is the same as that of the telephone number input operation described above (see FIG. 10 and FIG. 11).

Upon completion of the setting of the voice time out time, the flow returns to the process in step S71 described above (symbol D in FIG. 23), and the subsequent processes are repeated.

By the time set in this case, time out of the sound collecting operation in step S88 described above is determined. In addition, the time out time setting time is also used in an audio data transmission operation in execution of a television telephone mode (see step S97 to step S104 in FIG. 26).

Figure 26:
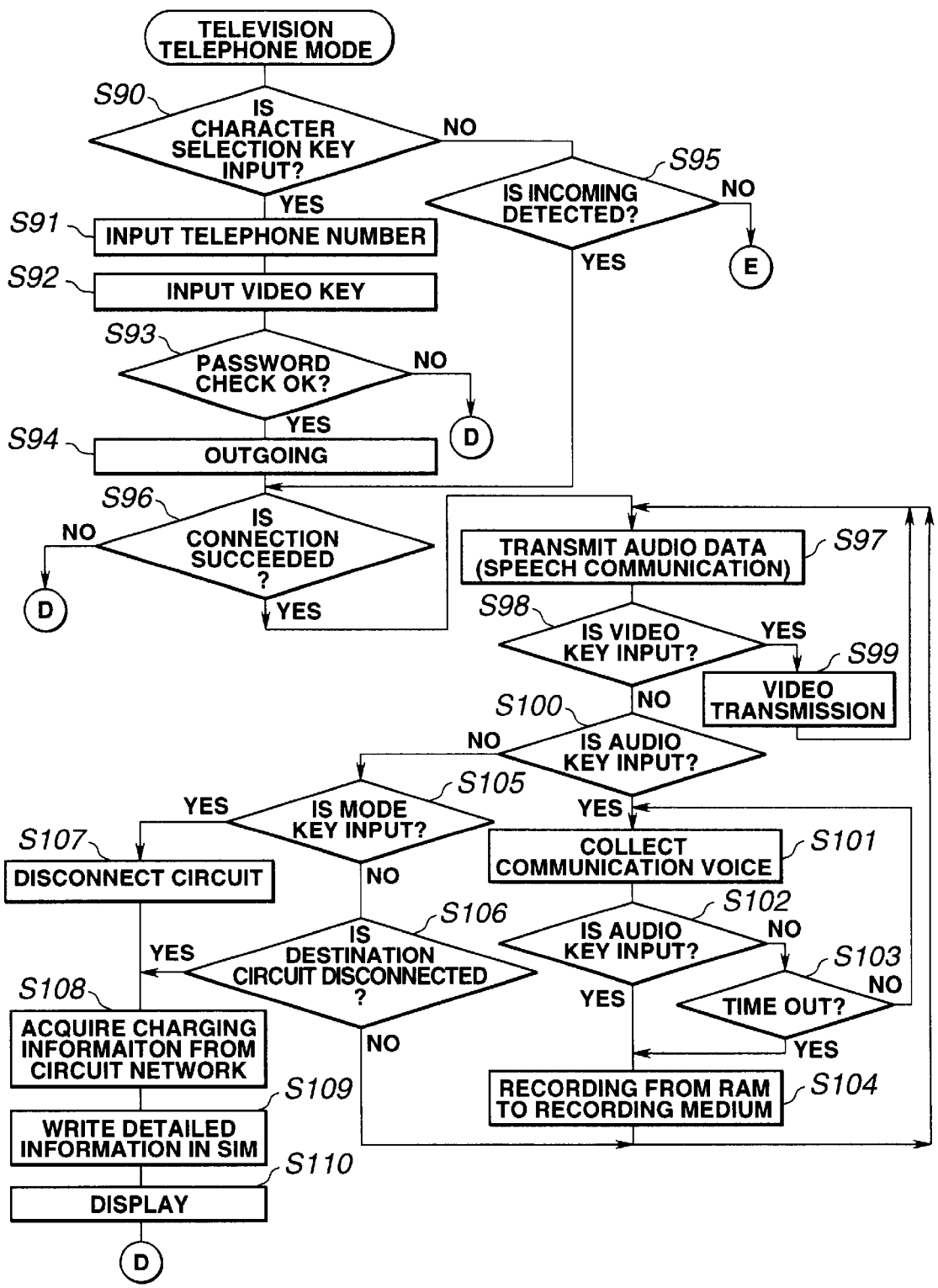
FIG. 26 is a flow chart of a television telephone mode of the electronic camera in FIG. 21.

FIG. 26 is a flow chart of a television telephone mode of the electronic camera.

In step S90, the CPU 1 monitors an input signal from the character selection key 44. If the input signal from the character selection key 44 is detected, the flow shifts to the process in next step S95. In step S95, an incoming signal from the RF unit 55 is monitored. If the incoming signal is not detected, the flow returns to the process in step S74 described above (symbol E in FIG. 23), and the subsequent processes are repeated. If the incoming signal is detected, it is determined that a call is made, and the flow shifts to the process in step S96.

In step S90 described above, an input signal from the character selection key 44 is detected, and the character selection key 44 is operated by the operator. If it is determined that a telephone number input operation is performed, the flow shifts to next step S91.

In step S91, the operator performs the telephone number input operation with the character selection key 44 and the ENTER key 43. Subsequently, in next step S92, the video trigger key 40 is pressed. In this manner, the input telephone number and an outgoing instruction are transmitted to the CPU 1.

In response to this, the CPU 1 performs password check in step S93. As a result of the password check, if a password inherent in the SIM 9 coincides with a password which is set and registered in the electronic camera 31 in advance, the flow shifts to next step S94. If both the passwords coincide with each other, the flow returns to the process in step S71 described above (symbol D in FIG. 23), and the subsequent processes are repeated.

In step S94, the CPU 1 transmits the telephone number information and the outgoing instruction input in step S92 described above to the transmission/reception signal processing circuit unit 54. In this manner, the transmission/reception signal processing circuit unit 54 controls the RF unit 55 to perform an outgoing operation. The flow shifts to the process in next step S96.

In step S96, it is determined whether connection to a communication destination is succeeded. If a character string signal such as "fail" is transmitted from the transmission/reception signal processing circuit unit 54 to the CPU 1, the CPU 1 determines that connection to the communication destination fails, the flow shifts to the process in step S71 described above (symbol D in FIG. 23), and the subsequent sequence is repeated.

In step S96 described above, when a character string signal such as "connect" is transmitted from the transmission/reception signal processing circuit unit 54 to the CPU 1, the CPU 1 determines that the connection to the communication destination is succeeded, and the flow shifts to the process in next step S97. In step S97, data transmission of an audio signal between the device and the communication destination becomes possible (speech communication state), and an audio data transmission operation is performed.

The audio data transmission operation performed at this time represents a speech communication state in a general telephone set, i.e., an operation of converting audio information obtained in conversation with the communication destination into an electric audio signal to transmit the audio signal.

More specifically, an encoded audio signal transmitted from the communication destination through the telephone circuit is received by the RF unit 55, input to the transmission/reception signal processing circuit unit 54, and then input to the audio signal processor 60. In the audio signal processor 60, the audio signal is decoded and subjected to a conversion process into an analog signal, and the resultant signal is output outside from the loudspeaker output unit 62 or the voice line output terminal 65.

At the same time, an audio signal (analog) input from the microphone input unit 63 or the voice line input terminal 64 is converted into a digital signal and encoded in the audio signal processor 60. The resultant signal is output to the transmission/reception signal processing circuit unit 54 and transmitted to the communication destination by the RF unit 55.

In an audio data transmission (speech communication) state in step S97, object images continuously focused by the photographing optical system 8 are converted into video signals (digital) through the CCD 32, the process processor 33, and the A/D converter 34, and the video signal are sequentially stored in the frame memory 36. At the same time, the video signals stored in the frame memory 36 are repetitively read by the D/A converter 35, converted into analog signals (video signals), and sequentially output from the video signal output terminal 39 to the external display device. The output form of the video signals at this time is a through image output in which video signals are sequentially, continuously reproduced.

In the audio data transmission (speech communication) state described above, input signals from the video trigger key 40, the voice trigger key 66, and the MODE key 42 are monitored by the CPU 1 (steps S98, S100, and S105).

Therefore, when an operator operates the video trigger key 40 in the audio data transmission (speech communication) operation, the flow shifts to the process in step S99, and a data transmission operation of a video signal is interrupted.

More specifically, if the CPU 1 detects an input signal from the video trigger key 40 in step S98 described above, audio data transmission and image reproduction from the video signal output terminal 39 are suspended. At the same time, of the video signals stored in the frame memory 36, a predetermined video signal (still image) obtained when the video trigger key 40 is operated is output to the companding circuit unit 38 through the video bus 51. The video signal is subjected to the compressing process by the companding circuit unit 38 and output to the transmission/reception signal processing circuit unit 54 through the system bus 2. The transmission/reception signal processing circuit unit 54 controls the RF unit 55 to transmit the predetermined video signal to the communication destination. Upon completion of data transmission of the video signal, the flow shifts to the process in step S97 described above, and the suspended audio data transmission operation and image reproduction from the video signal output terminal 39 are restarted.

When the operator operates the voice trigger key 66 without operating the video trigger key 40 in the audio data transmission (speech communication) operation in step S97 described above, the flow shifts to the process in next step In step S101, the CPU 1 controls the transmission/reception signal processing circuit unit 54 to start a sound collection operation of voice of speech communication. More specifically, encoded audio signals received by the RF unit 55 and output from the communication destination are output to the CPU 1 through the transmission/reception signal processing circuit unit 54 and the system bus 2. The CPU 1 sequentially stores the audio signals in the RAM 4. At the same time, audio signals input from the microphone input unit 63 or the voice line input terminal 64 is also output to the CPU 1 through the audio signal processor 60, the transmission/reception signal processing circuit unit 54, and the system bus 2. The CPU 1 sequentially stores the audio signals in the RAM 4.

Even in the sound collection operation, the CPU 1 continuously monitors the input signal from the voice trigger key 66 and monitors an elapsed time of the sound collection operation (steps S102 and S103).

Therefore, when the voice trigger key 66 is operated by the operator in the sound collection operation, or the set predetermined time has elapsed (time out is determined), the flow shifts to the process in next step S104.

In this case, as the predetermined time for determining time out, the time out time set by the operator in step S84 (see FIG. 25) described above is used.

In step S104, the CPU 1 reads the coded audio signal stored in the RAM 4 and records the audio signal as an audio data file in the recording medium unit 52. The flow returns to the process in step S97 described above, and the subsequent processes, i.e., the audio data transmission operation are repeated.

In addition, when the operator does not operates the video trigger key 40 and the voice trigger key 66 in the audio data transmission (speech communication) operation in step S97 described above, an input signal from the MODE key 42 is monitored in step S105. If the input signal from the MODE key 42 is not detected by the CPU 1, the flow shifts to the process in step S106. In step S106, the CPU 1 monitors the transmission/reception signal processing circuit unit 54 to check whether the transmission/reception signal processing circuit unit 54 receives a circuit disconnection signal, e.g., a character string signal such as "NO CARRIER" from the communication destination.

If the circuit disconnection signal is detected, i.e., if the RF unit 55 receives the circuit disconnection signal from the communication destination, and the signal is transmitted to the CPU 1 through the transmission/reception signal processing circuit unit 54, the flow shifts to next step S108. If the CPU 1 does not detect the circuit disconnection signal, the flow returns to the process in step 97 described above, and the subsequent processes are repeated.

If the input signal from the MODE key 42 is detected in step S105 described above, the flow shifts to the process in step S107. The CPU 1 controls the transmission/reception signal processing circuit unit 54 to perform a circuit disconnection operation, and the flow shifts to next step In step S108, charging information or the like related to the rate of the latest communication is acquired from a circuit network, and detailed information such as date information, use time information, destination telephone number information, or charging information (rate information) is formed on the basis of the acquired charging information or the like. The detailed information is recorded on the SIM 9 (step S109). The detailed information is displayed on the display unit 8 (step S110), the flow returns to the process in step S71 described above (symbol D in FIG. 23), and the subsequent processes are repeated.

As described above, if a circuit disconnection signal from a communication destination is detected in step S106, after the processes in step S108 to S110 are performed, the processes in the steps following step S71 described above are repeated. At this time, if an operator does not operate the MODE key 42, the operation mode is not changed. For this reason, the television telephone mode is set again. Therefore, a standby state for an input signal from the character selection key 44 operated by the operator or an incoming signal is set.

As described above, according to the fourth embodiment, when a function of processing audio data is further added, not only image data but also audio data can be easily data-transmitted.

INDUSTRIAL APPLICABILITY

According to the information communication apparatus of the present invention, after data communication is performed by a card-shaped communication device fixed to a fixing unit or another information communication device connected to a serial communication means, circuit use information such as charging information related to a rate and telephone number information is acquired, and the circuit use information is written in a card-shaped medium. For this reason, there can be provided an information communication apparatus in which, by operating an operation key for displaying the circuit use information at desired time, the circuit use information can be read from the card-shaped medium and displayed on a display means.

Therefore, according to the present invention, in an information communication apparatus or the like, having a card-shaped communication device fixed thereto, for performing communication such as data transmission by a communication means connected by a serial communication means, there can be provided an information communication apparatus which can easily perform communication such as data transmission even if a public telephone network requiring an SIM is used.

When an SIM is used, there can be provided a multifunction information communication apparatus having a function of assuring reliable security, a function of easily acquiring circuit use information such as charging information, a function of displaying the circuit use information, and the like.

What is claimed is:

1. An image and sound communication apparatus comprising:

image-pickup means for converting an optical picture focused by a photographic optical system into an electric video signal and for outputting the electric video signal;

communication means for performing data communication using a public telephone network;

a transmission/reception signal processing circuit unit for processing the video signal into a signal having a suitable form so that the video signal is transmitted by said communication means, and for processing the signal received by said communication means into a signal having a form suitable for recording or reproduction;

voice output means for outputting an audio signal;

voice input means for inputting an audio signal;

an audio signal processor, controlled by said transmission/reception signal processing circuit unit, for processing an audio signal stored in storage means or an audio signal received by said communication means into a signal having a form suitable for outputting from said audio output means, and for processing the audio signal input by said voice input means or the audio signal received by said communication means into a signal having a form suitable for recording;

storage means for storing the video signal obtained by said image-pickup means and the audio signal processed by said audio signal processor;

operation means for causing said image and voice communication apparatus to execute various processes;

display means for displaying contents and results of the operation performed by said operation means; and a loading unit for inserting a card-shaped medium in which line subscriber information is stored;

whereby transmission of image data and audio data is performed by said communication means;

wherein after data communication is performed by said card-shaped communication device fixed to said fixing unit, circuit use information is acquired and is written in said card-shaped medium, and after this writing, the contents of the operation caused by said operation means can be determined.

2. An image and voice communication apparatus according to claim 1, further comprising serial communication means for performing serial transmission between said serial communication means and another information device, characterized in that data transmission of image data and audio data is performed by said communication means or another information communication device connected to said serial communication means.

3. An image and voice communication apparatus according to claim 1, characterized in that said storage means is detachable from said image and voice communication apparatus.

4. An image communication apparatus according to claim 1, characterized in that said storage means is incorporated in said image and voice communication apparatus.

5. An image and voice communication apparatus according to claim 1, characterized by further comprising a voice memory used as a work memory when signal processing is performed by said audio signal processor.

6. An image and voice communication apparatus according to claim 1, characterized in that said operation means includes an operation key for setting a television telephone mode in which data transmission of image data and audio data is performed, and, when the television telephone mode is set by said operation key, data transmission of image data and audio data is performed.

7. An image and voice communication apparatus according to claim 1, characterized in that said operation means includes an operation key for performing a data transmission operation of the image data even in a data transmission operation of the audio data.

8. An image and voice communication apparatus according to claim 1, characterized in that said operation means includes a video recording designation key, a video signal of a still image is stored in said storage means when said video recording designation key is operated in an operation in a recording mode, and the video signal is transmitted when said video recording designation key is operated in execution of data communication of the audio signal in an operation in a television telephone mode.

9. An image and voice communication apparatus according to claim 1, characterized in that said operation means includes a voice recording designation key, an audio signal input from said voice input means is stored in said storage means when said voice recording designation key is operated in an operation in a recording mode, and a transmission/reception audio signal used in speech communication is stored in said storage means when said voice recording designation key is operated in execution of data communication of the audio signal in an operation in a television telephone mode.

10. An image and voice communication apparatus according to claim 1, characterized in that the circuit use information includes at least charging information related to a rate and telephone number information.

11. An image and voice communication apparatus according to claim 1, characterized in that said operation means includes an operation key for displaying the circuit use information, and, by operating said operation key, the circuit use information is read from said card-shaped medium and displayed on said display means.

12. An image and voice communication apparatus according to claim 1, characterized in that said operation means includes an operation key for setting and inputting a password such that a character string corresponding to a password inherent in said card-shaped medium can be registered.

13. An image and voice communication apparatus according to claim 12, characterized in that, when said card-shaped medium loaded on said loading unit to perform data communication using a public telephone network, inherent password information set for said card-shaped medium and password information set and registered for said image and voice communication apparatus by said operation key in advance are read, and password check is performed with respect to both the pieces of password information.

* * * * *